United States Patent
Pine et al.

(10) Patent No.: US 7,212,997 B1
(45) Date of Patent: May 1, 2007

(54) SYSTEM AND METHOD FOR ANALYZING FINANCIAL MARKET DATA

(76) Inventors: Ari Pine, 2001 Shoreline Dr., #302, Alameda, CA (US) 94501; Arthur L. Shmurun, 651 Moraga Rd., Suite 8, Moraga, CA (US) 94556

( * ) Notice: Subject to any disclaimer, the term of this patent is extended or adjusted under 35 U.S.C. 154(b) by 1087 days.

(21) Appl. No.: 09/590,942

(22) Filed: Jun. 9, 2000

(51) Int. Cl.
*G06Q 40/00* (2006.01)

(52) U.S. Cl. .................................. 705/36 R; 705/37

(58) Field of Classification Search .................... 705/1, 705/25–42
See application file for complete search history.

(56) References Cited

U.S. PATENT DOCUMENTS

| | | | | |
|---|---|---|---|---|
| 6,061,662 | A * | 5/2000 | Makivic | 705/36 R |
| 6,317,727 | B1 * | 11/2001 | May | 705/37 |
| 6,321,212 | B1 * | 11/2001 | Lange | 705/37 |
| 6,421,653 | B1 * | 7/2002 | May | 705/37 |
| 6,493,681 | B1 * | 12/2002 | Tertitski et al. | 705/36 |

\* cited by examiner

*Primary Examiner*—Frantzy Poinvil

(57) ABSTRACT

A financial market analysis system includes a derivatives database which provides for floating frames of reference for data organization and retrieval. The system provides searchable characteristics based on relation to characteristics of the underlying instruments, other options of similar expiry, and between options of different expiry. The database may contain comprehensive data on all relevant securities, including underlying market price data and derivatives of the same class. The system may provide more easily accessible querying options that are based upon the ordinal numbering of relative expiration dates to take advantage of the market's structure. The system may also provide more easily processed queries based on a derivative's proximity to the underlying instrument's market price. For options and instruments with embedded options, the system may order options expiring on the same expiration date by proximity to the at-the-money options. The system enables easier query formulation by transforming the frame of reference of the user from an absolute, cardinal system of particular securities to a relative, ordinal system that moves with time and the underlying instruments.

36 Claims, 15 Drawing Sheets

FIG. 8

| TRADEDATE | UNDER | EXPDATE | STRIKE | T | SPC | N | BID | ASK | VOLUME | IMPLIEDVOL | RELATIVESTRIKE | MONTHNUM | ROO | CO |
|---|---|---|---|---|---|---|---|---|---|---|---|---|---|---|
| 19-MAY-00 | MSFT | 16-JUN-00 | 45 | C | 45 | N | 0 | .125 | 0 | 0 | | -1 | VSO | FI |
| 19-MAY-00 | MSFT | 16-JUN-00 | 45 | P | 45 | N | 15.5 | 16 | 0 | 4.35 | | -1 | VSO | RI |
| 19-MAY-00 | MSFT | 19-MAY-00 | 50 | C | 100 | N | 14.625 | 15.375 | 37 | 0 | | 1 | MSQ | EJ |
| 19-MAY-00 | MSFT | 19-MAY-00 | 50 | P | 100 | N | 0 | .25 | 0 | 0 | | 1 | MSQ | QJ |
| 19-MAY-00 | MSFT | 19-MAY-00 | 55 | C | 100 | N | 9.75 | 10.125 | 15 | 0 | | 1 | MSQ | EK |
| 19-MAY-00 | MSFT | 19-MAY-00 | 55 | P | 100 | N | 0 | .25 | 13 | 0 | | 1 | MSQ | QK |
| 19-MAY-00 | MSFT | 19-MAY-00 | 60 | C | 100 | N | 0 | .1875 | 76 | 0 | | 1 | MSQ | EL |
| 19-MAY-00 | MSFT | 19-MAY-00 | 60 | P | 100 | N | 4.75 | 5.125 | 677 | 0 | | 1 | MSQ | QL |
| 19-MAY-00 | MSFT | 19-MAY-00 | 65 | C | 100 | N | .0625 | .25 | 9057 | 0 | 0 | 1 | MSQ | EM |
| 19-MAY-00 | MSFT | 19-MAY-00 | 65 | P | 100 | N | .0625 | .1875 | 9075 | 0 | 0 | 1 | MSQ | QM |
| 19-MAY-00 | MSFT | 19-MAY-00 | 70 | C | 100 | N | 0 | .0625 | 2072 | 0 | 5 | 1 | MSQ | EN |
| 19-MAY-00 | MSFT | 19-MAY-00 | 70 | P | 100 | N | 4.875 | 5.25 | 3000 | 0 | 5 | 1 | MSQ | QN |
| 19-MAY-00 | MSFT | 19-MAY-00 | 75 | C | 100 | N | 0 | .25 | 1030 | 0 | 10 | 1 | MSQ | EO |
| 19-MAY-00 | MSFT | 19-MAY-00 | 75 | P | 100 | N | 9.875 | 10.25 | 1353 | 0 | 10 | 1 | MSQ | QO |
| 19-MAY-00 | MSFT | 16-JUN-00 | 50 | C | 100 | N | 14.875 | 15.625 | 107 | 0 | -15 | 2 | MSQ | FJ |
| 19-MAY-00 | MSFT | 16-JUN-00 | 50 | P | 100 | N | .1875 | .375 | 136 | .64 | -15 | 2 | MSQ | RJ |
| 19-MAY-00 | MSFT | 16-JUN-00 | 55 | C | 100 | N | 10.25 | 10.75 | 70 | .4 | -10 | 2 | MSQ | FK |
| 19-MAY-00 | MSFT | 16-JUN-00 | 55 | P | 100 | N | .375 | .5625 | 187 | .52 | -10 | 2 | MSQ | RK |
| 19-MAY-00 | MSFT | 16-JUN-00 | 60 | C | 100 | N | 6.125 | 6.375 | 786 | .4 | -5 | 2 | MSQ | FL |
| 19-MAY-00 | MSFT | 16-JUN-00 | 60 | P | 100 | N | .9375 | 1.125 | 1235 | .43 | -5 | 2 | MSQ | RL |
| 19-MAY-00 | MSFT | 16-JUN-00 | 65 | C | 100 | N | 2.8125 | 3 | 5104 | .38 | 0 | 2 | MSQ | FM |
| 19-MAY-00 | MSFT | 16-JUN-00 | 65 | P | 100 | N | 2.5 | 2.75 | 1440 | .39 | 0 | 2 | MSQ | RM |
| 19-MAY-00 | MSFT | 16-JUN-00 | 70 | C | 100 | N | 1.0625 | 1.25 | 5366 | .39 | 5 | 2 | MSQ | FN |
| 19-MAY-00 | MSFT | 16-JUN-00 | 70 | P | 100 | N | 5.75 | 6.125 | 1131 | .41 | 5 | 2 | MSQ | RN |
| 19-MAY-00 | MSFT | 16-JUN-00 | 75 | C | 100 | N | .375 | .5 | 980 | .41 | 10 | 2 | MSQ | FO |
| 19-MAY-00 | MSFT | 16-JUN-00 | 75 | P | 100 | N | 10 | 10.375 | 422 | .42 | 10 | 2 | MSQ | RO |

SYSTEM AND METHOD FOR ANALYZING FINANCIAL MARKET DATA

TECHNICAL FIELD OF THE INVENTION

The present invention relates generally to the field of computers and, more particularly, to a system and method for analyzing financial market data.

REFERENCE TO MICROFICHE APPENDIX

The present specification includes a microfiche appendix. The total number of microfiche sheets in the microfiche appendix is 8. The total number of frames in the microfiche appendix is 164.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Derivatives are financial instruments which trade based on the value of one or more other instruments. Those instruments from which the derivatives gain their value are referred to as "underlying securities," "underlying instruments," or "underlying." In addition to the underlying securities, traders value derivatives based on their specification, time until expiration (which can be long or short term), market interest rates, any relevant cash flows, and the market's demand (or lack thereof) for that derivative. Derivatives may trade on their own, such as exchange traded futures and options, or as part of another instrument, such as a convertible bond.

Database systems have been previously developed to provide financial market information. In particular, previously developed systems are available for providing the value of a particular stock or bond on a particular date or to plot the fluctuations of that value over a range of dates. From the viewpoint of derivatives market traders, however, these previously developed systems are inadequate and/or problematic. For example, the information output by these systems is not very useful to traders in that they do not provide data on all relevant derivatives organized by relation to the market price and expiry of the underlying instrument. In addition, the organization of derivatives having different expiry dates is poor.

There is a clear need for a system which supplies option trading data in a form which is simple for options traders to review and analyze.

SUMMARY

In order to assist derivatives market traders in analyzing derivatives market information, the present invention provides a computer system and method for analyzing financial market data.

In accordance with an embodiment of the present invention, a method performed on a computer for analyzing financial market data is provided. The method comprises the steps of: storing in a database a plurality of derivative characteristics for each derivative in a plurality of derivatives; storing in the database a plurality of underlying instrument characteristics for an underlying instrument for the plurality of derivatives; determining a relative reference value for each derivative in the plurality of derivatives, said relative reference value being a function of a characteristic of the derivative and an analysis characteristic; selecting a reference criteria for evaluating the derivatives; and identifying each derivative having a relative reference value satisfying the reference criteria.

In accordance with another embodiment of the present invention, a computer system for providing derivatives market information comprises a database operable to maintain a plurality of derivative characteristics for each derivative in a plurality of derivatives and a plurality of underlying instrument characteristics for an underlying instrument, and a processing facility coupled to the database. The processing facility is operable to: determine a relative reference value for each derivative in the plurality of derivatives, said relative reference value being a function of a characteristic of the derivative and an analysis characteristic; select a reference criteria for evaluating the derivatives; and identify each derivative having a relative reference value satisfying the reference criteria.

The present invention provides numerous advantages over existing market analysis systems. As will be described in greater detail below, an advantage of embodiments of the present invention is the ability to transform market data into useful analysis information by presenting the market data using a floating frame of reference. This floating frame of reference may provide the ability to request reports based on strike proximity to underlying price and on time until expiration, without requiring extensive programming. Queries can be structured to use proximity to at-the-money (ATM) strikes as search criteria. In one embodiment, the computer system automatically calculates a relative strike price based on the strike price and the underlying price when trading data is entered into the database, and that data is stored as a field in each option's data point.

Another advantage provided by embodiments of the present invention is the use of a floating time frame of reference in which absolute expiration dates are transformed from month names to relative month locations.

Advantageously, embodiments of the present invention provide data on groups of relevant derivatives, such as all options within a given class, market context, and original pricing data. This data is collected from numerous data vendor sources and stored in an easily accessible database.

In addition, embodiments of the present invention generate historical data for: individual derivatives for relative pricing measures. These relative pricing measures are pricing measures between multiple derivatives, as opposed to absolute pricing measures, which relate to a single derivative.

This market information system permits traders and portfolio managers to pose sophisticated ad hoc queries against an extensive database containing historical underlying and derivative data at a level of detail and organization which was not previously available. Such a market information system enables users to quickly perform high-level research with the goal of substantially increasing trading profits.

Other aspects and advantages of the present invention will become apparent from the following descriptions and accompanying drawings.

BRIEF DESCRIPTION OF THE DRAWINGS

For a more complete understanding of the present invention and for further features and advantages, reference is now made to the following description taking in conjunction with the accompanying drawings.

FIG. 8 is sample data produced by a market data analysis system, according to an embodiment of the present invention.

DETAILED DESCRIPTION OF THE PREFERRED EMBODIMENTS

Figure 1:
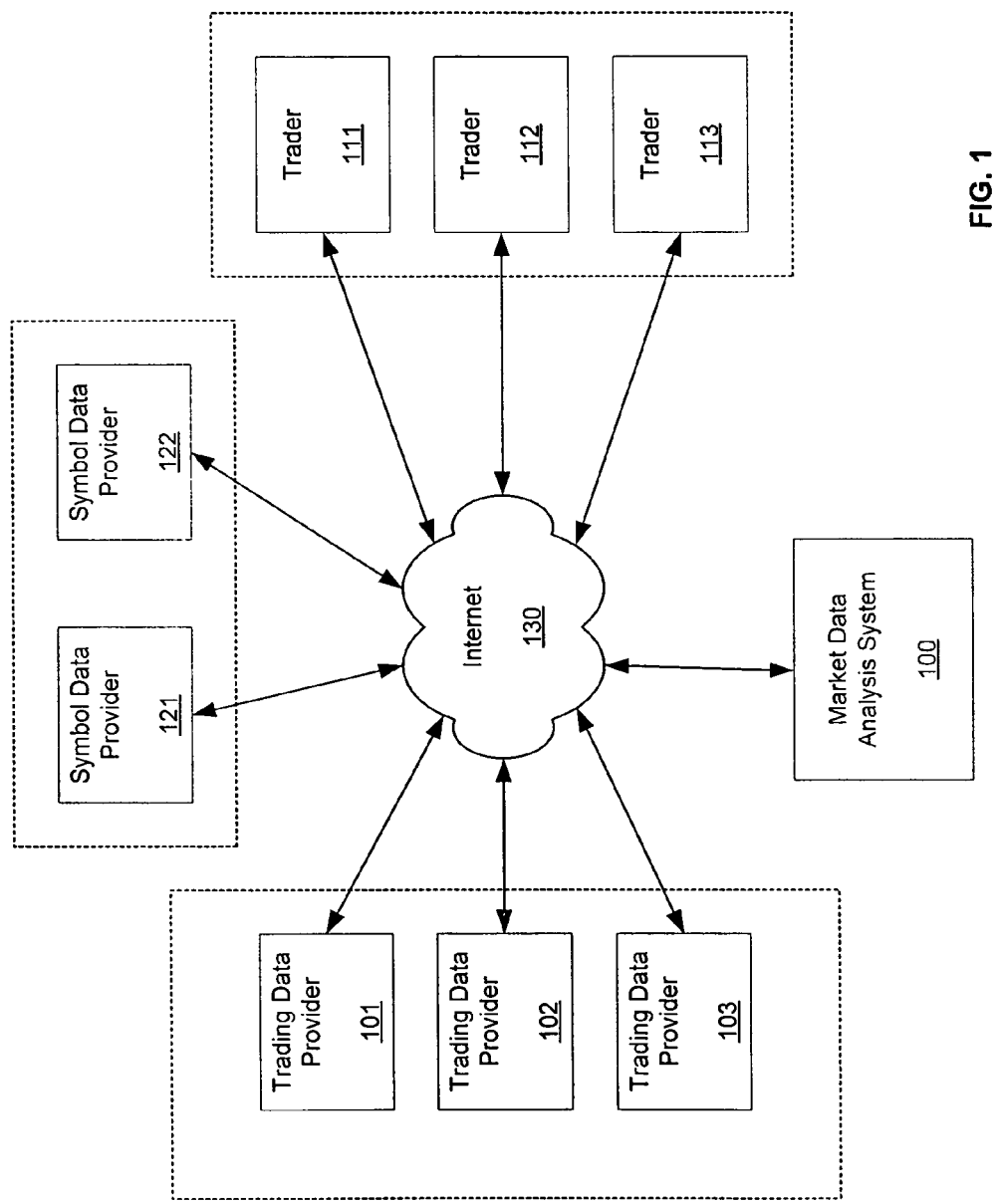
FIG. 1 illustrates an exemplary environment in which a market data analysis system according to an embodiment of the present invention may operate.

The preferred embodiments of the present invention and their advantages are best understood by referring to FIGS. 1–16 of the drawings. Like numerals are used for like and corresponding parts of the various drawings.

Turning first to the nomenclature of the specification, the detailed description which follows is represented largely in terms of processes and symbolic representations of operations performed by conventional computer components, such as a local or remote central processing unit (CPU) or processor associated with a general purpose computer system, memory storage devices for the processor, and connected local or remote pixel-oriented display devices. These operations include the manipulation of data bits by the processor and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For purposes of this discussion, a process, method, routine, or sub-routine is generally considered to be a sequence of computer-executed steps leading to a desired result. These steps generally require manipulations of physical quantities. Usually, although not necessarily, these quantities take the form of electrical, magnetic, or optical signals capable of being stored, transferred, combined, compared, or otherwise manipulated. It is conventional for those of ordinary skill in the art to refer to these signals as bits, values, elements, symbols, characters, text, terms, numbers, records, files, or the like. It should be kept in mind, however, that these and other terms should be associated with appropriate physical quantities for computer operations, and that these terms are merely conventional labels applied to physical quantities that exist within and during operation of the computer.

It should be understood that manipulations within the computer are often referred to in terms such as adding, comparing, moving, searching, or the like, which are often associated with manual operations performed by a human operator. It is understood that no involvement of the human operator may be necessary, or even desirable, in the present invention. The operations described herein are machine operations performed in conjunction with the human operator or user that interacts with the computer or computers.

In addition, it should be understood that the programs, processes, methods, and the like, described herein are but an exemplary implementation of the present invention and are not related, or limited, to any particular computer, apparatus, or computer language. Rather, various types of general purpose computing machines or devices may be used with programs constructed in accordance with the teachings described herein. Similarly, it may prove advantageous to construct a specialized apparatus to perform the method steps described herein by way of dedicated computer systems with hard-wired logic or programs stored in non-volatile memory, such as read-only memory (ROM).

Financial Market Explanation and Terminology

As previously discussed, derivatives are financial instruments which trade based on the value of one or more other instruments. One example of a derivative is an exchange-traded equity option. An option is an agreement between a buyer and a seller that gives the buyer the right, through exercise, to require the seller to perform certain specified obligations. For example, an American call option on a certain equity gives the buyer the right, but not the obligation, to purchase the equity during a stated period of time at a stipulated price. If the buyer decides to exercise his option to purchase, the seller (also referred to as the "writer") is obligated to sell the equity at the agreed upon price. If the buyer chooses not to exercise the option before the expiration date, the option becomes worthless.

The "premium" is the amount paid by the buyer to the seller to obtain the option. The equity for which the buyer is purchasing the option is the underlying security. The stipulated price at which the option can be exercised is the "strike price" or "exercise price." Strike prices are generally listed in increments of 2½, 5, or 10 points, depending on the market price of underlying security. However, in some situations, such as in response to a stock split, the strike price may be listed in other increments. The last day on which an option can be exercised is the "expiration date." Typically, each stock option covers 100 shares of the underlying security. The premium of an option must therefore be multiplied by the number of shares underlying the option (e.g., 100) in order to determine the aggregate premium of that option.

There are two general types of options: "calls" and "puts." A call option gives the buyer the right to purchase the underlying asset at the stated strike price on or before the expiration date. A put option gives the buyer the right to sell the underlying asset to the writer at the strike price on or before the expiration date.

There are two general styles of options: "American" and "European." In the case of an American option, the holder of the option has the right to exercise the option on or before the expiration date of the option; otherwise, the option will expire worthless and cease to exist as a financial instrument. Conversely, European options can only be exercised on expiration. Presently, all exchange-traded stock options in the United States are American-style options. As such, all options discussed herein will be with reference to American-style options. It should be understood, however, that other embodiments may incorporate other styles of options.

All option contracts that are of the same type and style and cover the same underlying security are referred to as a "class" of options. All options of the same class that also have the same strike price and expiration date are referred to as an option "series."

United States securities exchanges, such as the American Stock Exchange (AMEX), Chicago Board Options Exchange (CBOE), Pacific Stock Exchange (PCX), and Philadelphia Stock Exchange (PHLX), provide some standardization for equity options. All option contracts which trade on these exchanges are issued, guaranteed, and cleared by the Options Clearing Corporation (OCC).

Amongst other standardized features, exchange traded equity options have set expiration dates such that all options that are set to expire in a particular month will expire on the Saturday following the third Friday of that month. Although the actual expiration occurs on a Saturday, the trading of options ceases on the close of the third Friday of the month, which serves as an effective expiration date. Therefore, an option which has an expiration month of November 2000 will expire on 18 Nov. 2000. All classes currently include options that will expire in four expiration months, two of which expire in the upcoming expiration date and the subsequent expiration date. For example, if today is 1 Nov. 2000, then all classes will have options expiring in November and December 2000. After 18 Nov. 2000, all classes will then have options expiring in December 2000 and January 2001.

For conventional exchange-listed options, the expiration date can be up to nine months from the date the options are first listed for trading. In addition, there are longer-term options contracts, called LEAPS, which can have expiration dates up to three years from the date of listing. All LEAPS expire on the third Saturday of January of the specified year. In contrast, certain exchange-traded options, such as Over-the-Counter (OTC) and Flexible Exchange (FLEX) options, have non-standardized specifications and can expire on any date. OTC options, which are not backed by the OCC, are contracts between two named individuals, and can have any specifications agreed upon by the two contractors. FLEX option contracts provide non-standard specifications (i.e., different expiration dates & strikes) but still have OCC backing.

In addition to the option designations formally used by the exchanges, individual options traders often refer to options by relative location to the upcoming expiration month. Using the example from above, if today is 1 November 2000, then the options having a November 2000 expiration date may be referred to as "front month" options. Similarly, the options having a December 2000 expiration date may be referred to as "second month" options. This relative month characterization provides useful information to traders who are typically more interested in the approximate time to expiration rather than in absolute dates.

The term "at-the-money" or "ATM" means that the current market value of the underlying security is the same as or closest to the exercise price of the option. The term "in-the-money" refers to an option having intrinsic value. Intrinsic value is defined as the difference of the strike price from the stock price for calls and the difference of the stock price from the strike price for puts when such a value is greater than zero. For example, a call option is in-the-money if the strike price is less than the current market price of the underlying security, and a put option is in-the-money if the strike price is greater than the current market price of the underlying security. Out of the money options are those options having no intrinsic value.

"Parity" refers to the intrinsic value of an option. For example, a call option having a strike price of $100 and an underlying security with a market value of $120 would have an intrinsic value of $20. The "premium over parity" of an option is the difference between the premium cost and the parity amount. Therefore, in this example, if the premium of this option was $25, then the premium over parity would be $5. Typically, a larger premium over parity presents a higher risk for the trader.

"Volatility" refers to the propensity of the underlying security's market price to fluctuate either up or down. Therefore, volatility of the underlying share price influences the option premium. Generally, the higher the volatility of the stock, the higher the premium because there is a greater possibility that the option will move into or out of the money.

It is common for traders to combine purchases and sales of derivatives, such as put or call options. As used herein, the term "derivative" is intended to refer to both individual derivative securities and combinations of derivatives for a single trading strategy. For example, in one type of derivative analysis, a trader may wish to analyze the simultaneous purchase and sale of a call option. In such a case, the trader may consider both the purchase and the sale as a single trading strategy.

A "straddle" is the purchase or sale of both a call and a put with the same expiration date, underlying, and strike price. An "ATM straddle" is a straddle whose strike price is at-the-money. Options which are at-the-money tend to be the most heavily traded options, and the ATM straddle for those options will generally have the largest amount of premium over parity for options expiring that month. ATM options also tend to have the greatest overall sensitivity to the many variables used to price options. In addition, the straddle defines the market's expectation for the range or volatility for that stock with some defined time until expiration. In sum, the ATM options provide a rough picture of the market's overall demand for options, an can provide a significant amount of useful information for traders.

An option contract is defined by the following elements: type (put or call), style (American or European), underlying security, unit of trade (number of shares), strike price, and expiration date. As a derivative instrument, option pricing typically depends on the following information: (1) price and behavior of the underlying instrument(s); (2) time until expiration; (3) strike price of the option; (4) interest rates and divided payments; and (5) level of demand for options.

As described above, a class of options are all of the option contracts that are of the same type and style and cover the same underlying security. There exist certain relationships between options of the same class because they share the same underlying instrument. Therefore, options can be considered to be members of a set of options rather than individual instruments. These relationships can be used by traders to consider the value of an option in the context of other options in the same set—i.e., the relative value of the option. To manage the complexity of the entire set of an options class, traders can create subsets by expiration month and organize the options by month and by strike price. If one considers the expiration month and the strike price to be x- and y-coordinates, respectively, each option can be plotted in a chart in which the most closely related options (those with similar strike prices and expiration dates) are located in close proximity with each other. The ATM strike price would be considered the "zero" point. Because the market price of the underlying instrument may change over time, the ATM strike price will change accordingly. Thus, by selecting the ATM strike price as the "zero" point, one can create a "floating" frame of reference with which to analyze market data.

Another way for traders to better analyze options pricing is through the use of a variety of options pricing models. One well-known pricing model is described in F. Black and M. Scholes, "The Pricing of Options and Corporate Liabilities," Journal of Political Economy, 81 (May–June 1973), 637–54. Each of these models uses the same input data—strike price, underlying price, appropriate interest rate, cash flows associated with the underlying (e.g., dividends), type of exercise, option type (i.e., call or put), and some measure of volatility—to produce a theoretical value for a given option. Similarly, given a market price for an option and a set of input data, it is possible to apply the pricing models in reverse to obtain a value for one of the parameters. One commonly calculated parameter is "implied volatility." An implied volatility is determined based on the other parameters and the option's market price.

Implied volatility places a particular option's current market price in the context of the current market in general. Many options data vendors provide implied volatility calculations. One example is the Volatility Index (VIX) published by the Chicago Board Options Exchange (CBOE). The VIX is an index of implied volatility for the Standard and Poor's (S&P) 100 index options based on the front two expiration month ATM options. Similar implied volatility calculations are provided by a number of companies, such as Bloomberg and www.OptionsAnalysis.com. PMPublishing provides an implied volatility calculation for options on futures contracts. There are a multitude of other options pricing models, including proprietary models used by individual traders. There exists a wide variety of pricing models, and each model may calculate different implied volatilities or option values given the same parameters. As will be described in greater detail below, embodiments of the present invention include the original market data and prices, which advantageously enables traders to use the system to produce their own implied volatility calculations, given the model of their choice.

"Skew" refers to the difference of implied volatilities between options having different strikes of the same class and expiry. Typically, the implied volatility of the higher strike is subtracted from the lower strike. Skew is a metric for relative value between strikes. A trader may analyze the most heavily traded options, such as the ATM straddle, to judge demand for premium and use skew perceptions to price individual series. Traders may base pricing decisions on proximity to the ATM options. As the underlying stock moves to different prices, the ATM strike changes and so does the trader's frame of reference.

System Overview

FIG. 1 illustrates an exemplary environment in which a market data analysis system 100 according to an embodiment of the present invention may operate. In particular, FIG. 1 depicts a plurality of trading data providers 101–103. Each trading data provider 101–103 can be an entity which generates and/or collects trading data, and provides the same to others, for example, one or more traders 111–113. Exemplary trading data providers are, for example, the individual exchanges (AMEX, CBOE, PCX, and PHLX), the Option Price Reporting Authority (OPRA), or a vendor, such as Standard & Poor's ComStock, Data Transmission Network or Bridge Information Systems, Inc. The trading data for each derivative provided by the trading data providers includes an option symbol, and general financial market data, such as bid, ask, last trade, open, high, low, volume, and open interest.

A number of symbol data providers 121 and 122 provide data regarding the symbols and identification information for the various options available for purchase. These symbol data providers 121, 122 may be, for example, the OCC, the various securities exchanges (e.g., ASE, CBOE, PCX, and PHLX), or other third-party vendors. As shown, symbol data providers 121, 122 are separate entities from the trading data providers 101–103. Alternatively, some trading data providers may provide both symbol and trading data information.

Traders 111–113 can be entities which trade derivatives or any other entity interested in derivatives. Thus, traders can be individuals, institutions, or organizations (e.g., investment banks, brokers, etc.) which have an interest in derivatives. As shown, traders are linked directly to Market Data Analysis System 100 via the Internet 130, but there may be intermediaries between System 100 and the Traders.

Trading data providers 101–103, traders 111–113, and symbol data providers 121, 122 may interact with market data analysis system 100 via the Internet 130. Internet 130 is an interconnection of computer "clients" and "servers" located throughout the world and exchanging information according to Transmission Control Protocol/Internet Protocol (TCP/IP), Internetwork Packet eXchange/Sequence Packet eXchange (IPX/SPX), AppleTalk, or other suitable communications protocol. Internet 130 supports the distributed application known as the "World Wide Web" ("Web"). Web servers maintain websites, each comprising one or more web pages at which information is made available for viewing. Each website or web page can be identified by a respective uniform resource locator (URL) and may be supported by documents formatted in any suitable language, such as, for example, hypertext markup language (HTML), extended markup language (XML), or standard generalized markup language (SGML). Clients may locally execute a "web browser" program. A web browser is a computer program that allows exchange of information with the World Wide Web. Any of a variety of web browsers are available, such as NETSCAPE NAVIGATOR from Netscape Communications Corp., INTERNET EXPLORER from Microsoft Corporation, and others that allow convenient access and navigation of Internet 130. Information may be communicated from a web server to a client using a suitable protocol, such as, for example, Hypertext Transfer Protocol (HTTP) or File Transfer Protocol (FTP).

In general, market data analysis system 100 functions to receive the symbol data and trading data from data providers (e.g., trading data providers 101–103 and symbol data providers 121, 122) and generate information which is more useful to traders 111–113. This generated information constitutes analysis information, and can include, for example, ATM strike information, as well as reports on derivatives based on a relative expiration time. With the analysis information provided by market data analysis system 100, as described herein, traders 111–113 can more effectively and efficiently analyze market data to execute profitable options trades.

Market Data Analysis System

Figure 2:
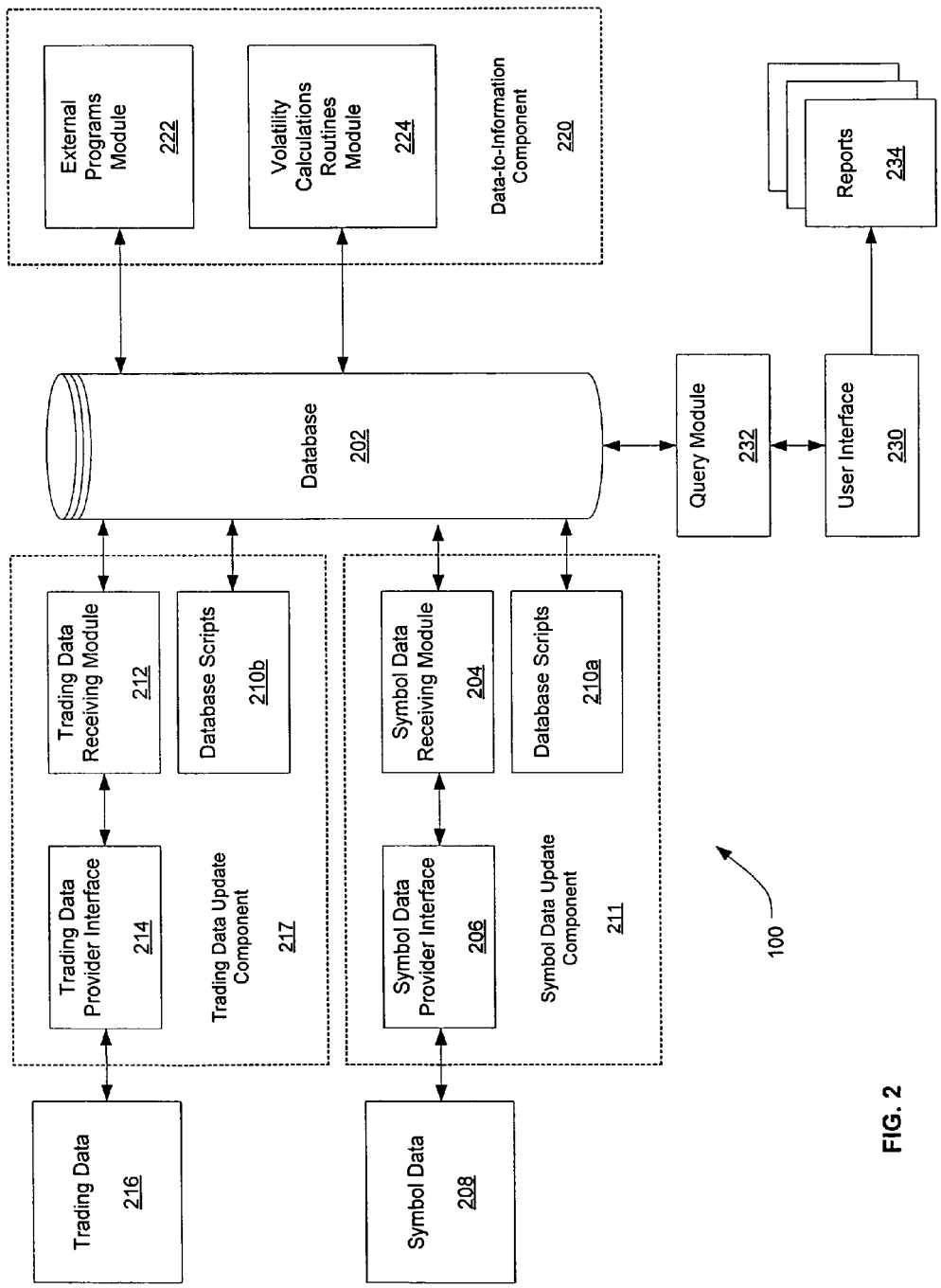
FIG. 2 is a block diagram for a market data analysis system, according to an embodiment of the present invention.

FIG. 2 illustrates a market data analysis system 100, according to an embodiment of the present invention. As shown, market data analysis system 100 includes a database 202, a symbol data update component 211, a trading data update component 217, a data-to-information component 220, a query module 232, and a user interface 230.

Database 202 is used to store the relevant market data and analysis information and forms the core of system 100. Database 202 may be implemented with any suitable hardware and/or software. This may include a scalable structured query language (SQL) database software program, such as, for example, Oracle 8i database software running on an Intel-based personal computer using the Linux operating system (OS). Database 202 can include one or more suitable storage media, such as disk drives, optical drives, FLASH memory, tape storage, random access memory (RAM), read-only memory (ROM), or other suitable volatile and/or non-volatile data storage facility. Other variations of the database, hardware, and operating system are possible, as would be understood by one of ordinary skill in the art.

Symbol data update component 211 is connected to database 202. As used herein, the terms "connected," "coupled," or any variant thereof means any connection or coupling, direct or indirect, between two or more elements. Such connection can be logical or physical. Symbol data update component 211 generally functions to receive and update symbol data 208, which is ultimately stored and maintained in database 202. As depicted, symbol data update component 211 includes a symbol data provider interface 206, a symbol data receiving module 204, and database scripts 210a.

Symbol data provider interface 206 generally serves as an interface for one or more external vendor sources, such as data symbol providers 121, 122 (FIG. 1). The functionality of symbol data provider interface 206 and other interfaces described herein can be performed by any suitable communications hub or router in combination with any one or more suitable processors, such as a mainframe, a file server, a workstation, or other suitable data processing facility supported by memory (either internal or external), running appropriate software, and operating under the control of any suitable operating system (OS), such as, for example, MS-DOS, MACINTOSH OS, WINDOWS NT, WINDOWS 98, OS/2, UNIX, LINUX, and the like.

Symbol data receiving module 204 cooperates with symbol data provider interface 206 to receive symbol data 208 from the one or more external vendor sources, such as symbol data providers 121, 122 (FIG. 1). Each symbol data provider may maintain symbol data 208 in one or more of its own databases. An exemplary symbol data file retrieved by symbol data retrieving module 204 is shown in Appendix D.

Database scripts 210a are used by symbol data receiving module 204 to store this symbol data 208 and to generate a list of symbols to request from trading data providers 101–103. In one embodiment, database scripts 210a comprise SQL scripts, external Linux shell scripts, and/or C programs. Exemplary database scripts 210a are provided in Appendix A. Numerous variations of these scripts are possible, such as the use of a fully automated program written in C or Java which links directly to database 202 using, for example, JDBC, ODBC, or a pre-compiler. In an alternative embodiment, a user can manually retrieve symbol data 208 through symbol data provider interface 206.

Symbol data update component 211 provides technical advantages. In particular, the periodic updating of symbol data is desirable because there is currently no definitive system for naming option symbols. The OCC provides guidelines for symbol names, but as a result of volatile stocks, previously used symbols are re-used or random codes are used. New options are added, deleted, and changed daily. It is not uncommon to have nearly one thousand symbol changes in a single day. Even roots and underlying securities change regularly, particularly at expiration. In addition, this symbol data may be provided in non-standard form, thus requiring entry by a human operator. Appendix D is an exemplary symbol data file received from the OCC containing a list of roots for equity LEAPS. This file may be used to determine which underlying security is associated with a given root.

Trading data update component 217 generally functions to receive trading data 216 which is ultimately stored and maintained with symbol data 208 in database 202. As depicted, trading data update component 217 includes a trading data provider interface 214, a trading data receiving module 212, and database scripts 210b.

Trading data provider interface 214 generally serves as an interface for one or more trading data sources, such as trading data providers 101–103 (e.g., AMEX, CBOE, PCX, PHLX, OPRA, Data Transmission Network, Bridge, and S&P Comstock). Trading data receiving module 212 uses the symbol list produced by the symbol update portion 211 and retrieves trading data 216 for the options contained in the symbol list generated by symbol data update component 211. Database scripts 210b are scripts which are used by trading data receiving module 212 to store trading data 216 in database 202, as will be described in greater detail below. Exemplary database scripts 210b are provided in Appendix A.

The symbol data 208 retrieved by symbol data update component 211 and the trading data 216 retrieved by trading data update component 217 together form the market data. Once this market data is collected and stored in database 202, data-to-information component 220 generally functions to transform the abundance of collected market data into analysis information which can be more easily understood and readily analyzed by end users (e.g., traders 111–113 (FIG. 1)), thereby enabling the users to make well-informed option trading decisions. As shown, data-to-information component 220 includes an external programs module 222 and a volatility calculations routines module 224.

External programs module 222 performs a number of functions on the received market data. For example, external programs module 222 takes the market data from database 202, calculates differences between strike prices and the ATM strike corresponding to the market price of the underlying instrument, and determines which options have strike prices which are ATM strikes. External programs module 222 also takes the expiration dates for the various options and calculates the relative month number (e.g., front month, second month, etc.) for each option. Exemplary source code listings for external programs module 222 are provided in Appendix A.

Volatility calculation routines module 224 for each option calculates implied volatilities and uploads the calculated volatilities into database 202. Various utilities are available for moving data from external files into commercially-available databases. One such utility is the SQL*Loader utility (SQLLDR) which can be used to load data into an Oracle 8i database.

The operation of symbol data update component 211, trading data update component 217, and data-to-information component 220, as described herein, creates a unique data structure for information relating to one or more derivatives. An exemplary embodiment for this data structure is shown and described with reference to FIG. 4. This data structure can be readily queried to obtain reports and other analysis information which is very useful to traders.

User interface 230 supports interaction by a user (e.g., traders 111–113) with market data analysis system 100, for example, via the Internet 130. The functionality of user interface 230 can be performed by one or more suitable input devices, such as a keyboard, touch screen, input port, pointing device, microphone and/or other device that can accept information, and one or more suitable output devices, such as a computer display, output port, speaker, or other device, for conveying information, including digital data, visual information, or audio information. In one embodiment, each user interface 230 may comprise or is operable to display at least one graphical user interface (GUI) having a number of interactive devices, such as buttons, windows, pull-down menus, and the like, to facilitate the entry, viewing, and/or retrieval of information. For example, the GUI may be an HTML/CGI-based GUI operating on a web browser.

Query module 232 enables trader 111 to generate queries to database 202. PERL code can be used to make the calls to database 202 using, for example, Oracle software. In response to these queries, market data analysis system 100 may generate reports 234. The outputted reports 234 may be processed for display by a software program such as, for example, Gnuplot. Gnuplot is a command-line driven interactive function plotting utility for UNIX, MS-DOS, and VMS platforms, and numerous versions of Gnuplot are readily available as freeware on the Internet 130.

Basic Operation

Figure 3:
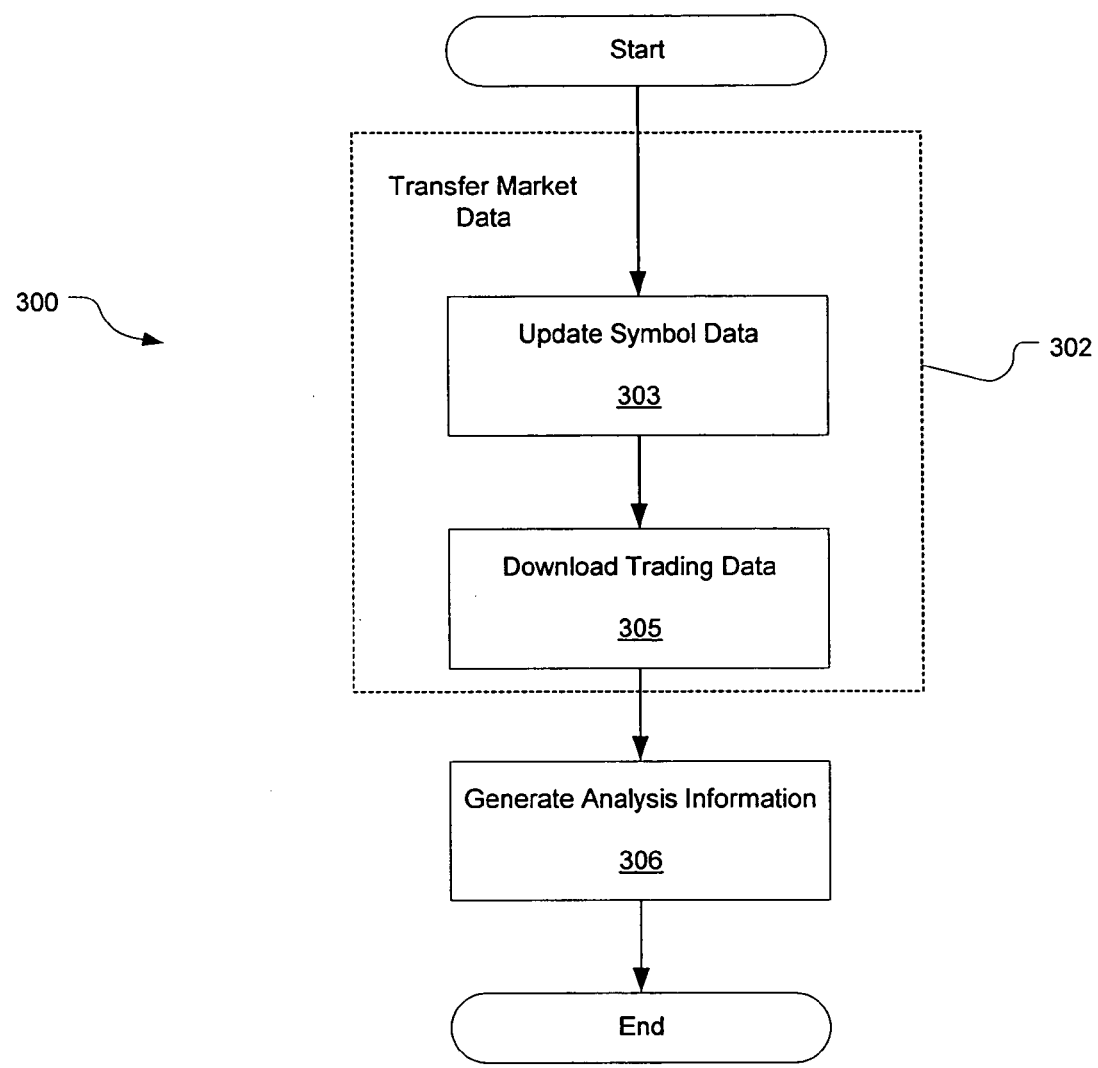
FIG. 3 is a flow diagram of an exemplary method for updating market data, according to an embodiment of the present invention.

FIG. 3 is a flow diagram of an exemplary method 300 for updating market data using market data analysis system 100, according to an embodiment of the present invention. Method 300 can be performed at regular intervals or at a predetermined time, for example, once every day, once every hour, at 7:00 PM EST, etc.

Method 300 begins at step 302, where market data is transferred into database 202. This market data includes symbol data 208 and trading data 216. Symbol data update component 211 of system 100 updates the symbol data for the available options from symbol data providers at 303. Next, at step 305, trading data update component 217 uses the updated symbol data to download trading data from trading data providers 101–103. At step 306, data-to-information component 220 uses the downloaded market data to create analysis information which is useful to users/traders. The analysis information can be used to create reports in response to queries from users.

Figure 4:
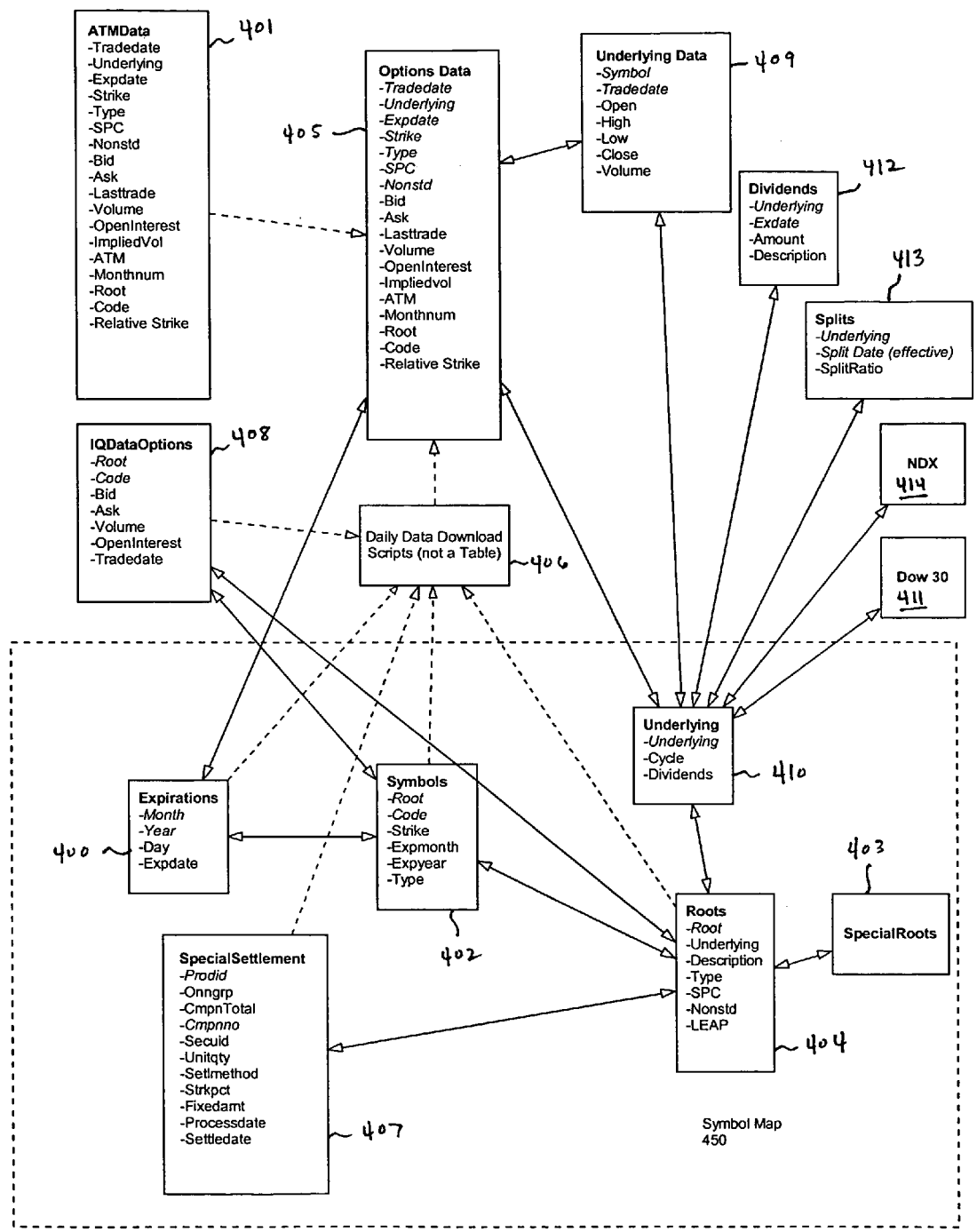
FIG. 4 is a block diagram of a database structure for a market data analysis system, according to an embodiment of the present invention.

Database Organization (FIG. 4)

FIG. 4 is a block diagram of a database structure for a market data analysis system 100, according to an embodiment of the present invention. In particular, FIG. 4 illustrates tables and relationships of data within database 202 for one embodiment. These tables may include Expirations table 400, ATMData table 401, Symbols table 402, SpecialRoots table 403, Roots table 404, OptionsData table 405, SpecialSettlement table 407, IQDataOptions table 408, UnderlyingData table 409, Underlying table 410, DOW table 411, Dividends table 412, Splits table 413, and NDX table 414. The fields in these tables store the characteristics of the derivatives and underlying securities to be analyzed by system 100. As will be described in greater detail below, some of these characteristics are retrieved from external third parties (e.g., data vendors) and other characteristics are calculated based on the retrieved data. All of these retrieved and calculated characteristics may be used to provide useful market information to users.

Each table includes values for one or more fields. Fields which make up the primary key for a table are italicized. The primary keys are used to define a unique record in database 202. Solid arrows between tables represent links and dotted arrows represent temporary relationships, such as those used for periodically updating data. Exemplary scripts used to define these tables 400–405, 407–414 in an Oracle 8i database are provided in Appendix B.

Expirations table 400, Symbols table 402, SpecialRoots table 403, Roots table 404, SpecialSettlement table 407, and Underlying table 410 comprise a symbol map 460. Underlying table 410 contains a list of all of the underlying instruments for which options are available. A description of the fields in Underlying table 410, as well as the other tables in FIG. 4 is provided in Appendix C. Roots table 404 contains at least one root for each underlying instrument. Each root specifies a subset of options corresponding to a given underlying instrument. A particular root may describe, for example, all standard options for an underlying, the set of 2001 LEAPS, or a set of non-standard options. Roots table 404 also includes fields (described in Appendix C) that describe or characterize the options which are available.

Symbols table 402 stores root and code pairs. The code specifies a particular series (expiration month, strike, and type) that share the same root. Individual options can be uniquely identified by a root and code pair. The attributes that uniquely identify an option are found in both the Roots table 404 and Symbols table 402. Some of these attributes are contained in the following fields: UNDERLYING (underlying security), STRIKE (strike price), EXPMONTH and EXPDYEAR (expiration date), TYPE (call or put), and NONSTD (OCC-identified options having more than one component).

SpecialSettlement table 407 stores any non-standard roots and their features. SpecialSettlement table 407 is linked to Roots table 404 via the PRODID and ROOTS fields. These non-standard features may include, for example, delivery of a different number of shares, as opposed to standard options in which 100 shares are delivered.

Expirations table 400, which is linked to Symbols table 402, stores the expiration dates for each option in the MONTH, YEAR, and DAY fields. The EXPDATE field is a database-defined field constrained to be specified by the MONTH, YEAR, and DAY fields. In the example illustrated in FIG. 4, Expirations table 400 and Symbols table 402 are linked via the EXPMONTH and EXPYEAR fields.

UnderlyingData table 409 stores the pricing data for underlying instruments which is collected by trading data receiving module 212. The options trading data which is collected by trading data receiving module 212 is stored in IQDataOptions table 408. This trading data must be combined with the symbol data before it can be stored in OptionsData table 405. Therefore, IQDataOptions table 408 facilitates the transfer of options trading data into OptionsData table 405 by storing the options trading data prior to its combination with the symbol data from symbol data receiving module 204. The data contained in UnderlyingData table 409 is used to calculate the ATM, MONTHNUM, RELATIVESTRIKE, and IMPLIEDVOL fields in OptionsData table 405.

Market data download module 406 is used to combine the trading data stored in IQDataOptions table 408 with the symbol data stored in the symbol map 460.

OptionsData table 405 stores all of the market data retrieved from the symbol data providers 121, 122 and trading data providers 101–103. The primary key for OptionsData table 405 is formed by the following fields: TRADEDATE; UNDERLYING; EXPDATE; STRIKE; TYPE; SPC; and NONSTD. These fields enable each option to be uniquely identified without reliance on the root and code identifiers. As described above, the symbol data (roots and codes) change over time and may be re-used by OCC as options expire.

Exemplary data contained within OptionsData table 405 is shown in FIG. 8. Two important aspects of this data illustrated by FIG. 8 are the symbol mapping and the market data transformation. In the symbol mapping, the market data is mapped such that the option symbols (root and code) are translated to relevant information (e.g., strike, underlying, expiration, etc.). The transformation enables a floating frame of reference to be used for analyzing the market data, and occurs in the columns corresponding to fields MONTHNUM and RELATIVESTRIKE. The ATM field does not appear in FIG. 8, but may also be included in OptionsData table 405. ATM is set to "0" if the option is an ATM strike, "–1" otherwise.

MONTHNUM references the order of expiry, so the value should be between 1 and 5 for standard options and 20 or 21 for LEAPS. MONTHNUM enables a conversion from a absolute date of expiry to a floating frame of reference expiry that is a function of the absolute expiration date and a reference date that is the time period from which the market data was sampled. For each record in OptionsData table 405, this reference date is stored in the TRADEDATE field. For example, consider an Option X having an absolute expiration date of 18 Mar. 2000. When the reference date is 1 Mar. 2000 (i.e., the user is analyzing Option X from the perspective that the current date is 1 Mar. 2000), Option X would be considered a front month option. Thus, MONTHNUM would be given a value of "1". However, if the reference date were 1 Feb. 2000, then Option X would be a second month option, and MONTHNUM would be set at "2". This floating frame of reference transformation enables a trader to analyze the market data from various perspectives.

Similarly, RELATIVESTRIKE is field which provides a floating frame of reference for analyzing the strike prices of an option. RELATIVESTRIKE contains a value which is the difference between the strike price of the option and the ATM strike corresponding to the market price of the underlying instrument. Because the market price of the underlying instrument changes over time, the value of RELATIVESTRIKE changes accordingly, depending on the frame of reference.

It is possible, though unlikely, that there may exist multiple non-standard options having the same strike price and same expiration date. For this reason, in one embodiment, SpecialRoots table 403 contains a list of roots for which no data should be downloaded. For example, when one entity merges or acquires another, the options of the acquired entity trade as options of the acquirer. It is possible that a single acquirer may obtain more than one acquired underlying. The options may exist at the same time (or split adjust options may conflict). In such a situation, these roots are stored in SpecialRoots table 403 to indicate that no market data should be downloaded.

ATMData table 401 stores the market information transformed by external programs module 222 (FIG. 2). As described above, external programs module 222 takes the market data contained in Roots table 404, OptionsData table 405, and UnderlyingData table 409, calculates the value for the RELATIVESTRIKE field, and determines which options have strike prices which are at-the-money. External programs module 222 also calculates the relative month number for each option, based on the expiration date and the current date, and stores this in the MONTHNUM field. After this market information is stored in ATMData table 401, the market information is then updated to OptionsData table 405.

Dividends table 412 stores the dividend data for the underlying securities. This dividend data may be manually entered into Dividends table 412 based on a review of corporate news and events. Volatility calculation routines module 224 (FIG. 2) uses this dividend data, together with data on the underlying price, option series info (strike, expiration, etc.), trading date, interest rate, and the premium of the option, to calculate implied volatilities and then uploads these calculated volatilities to the IMPLIEDVOL field in OptionsData table 405.

SPLITS table 413 is used only to recreate non-split-adjusted option and underlying data. A stock split increases the number of shares. Historical data, such as underlying price, underlying volume, option strikes, option prices, option volumes, open interest, and dividends, must be adjusted for this increase. For example, a 2-for-1 stock split would halve all stock prices and double the volume. It would also halve the option prices and strikes, but double open interest & volumes. Dividends would be halved. To accommodate traders who might wish to view the unadjusted data, an embodiment of system 100 stores the split information to undo the adjustments. An exemplary process for performing these functions is provided in addSplit.sql in Appendix A.

Figure 5:
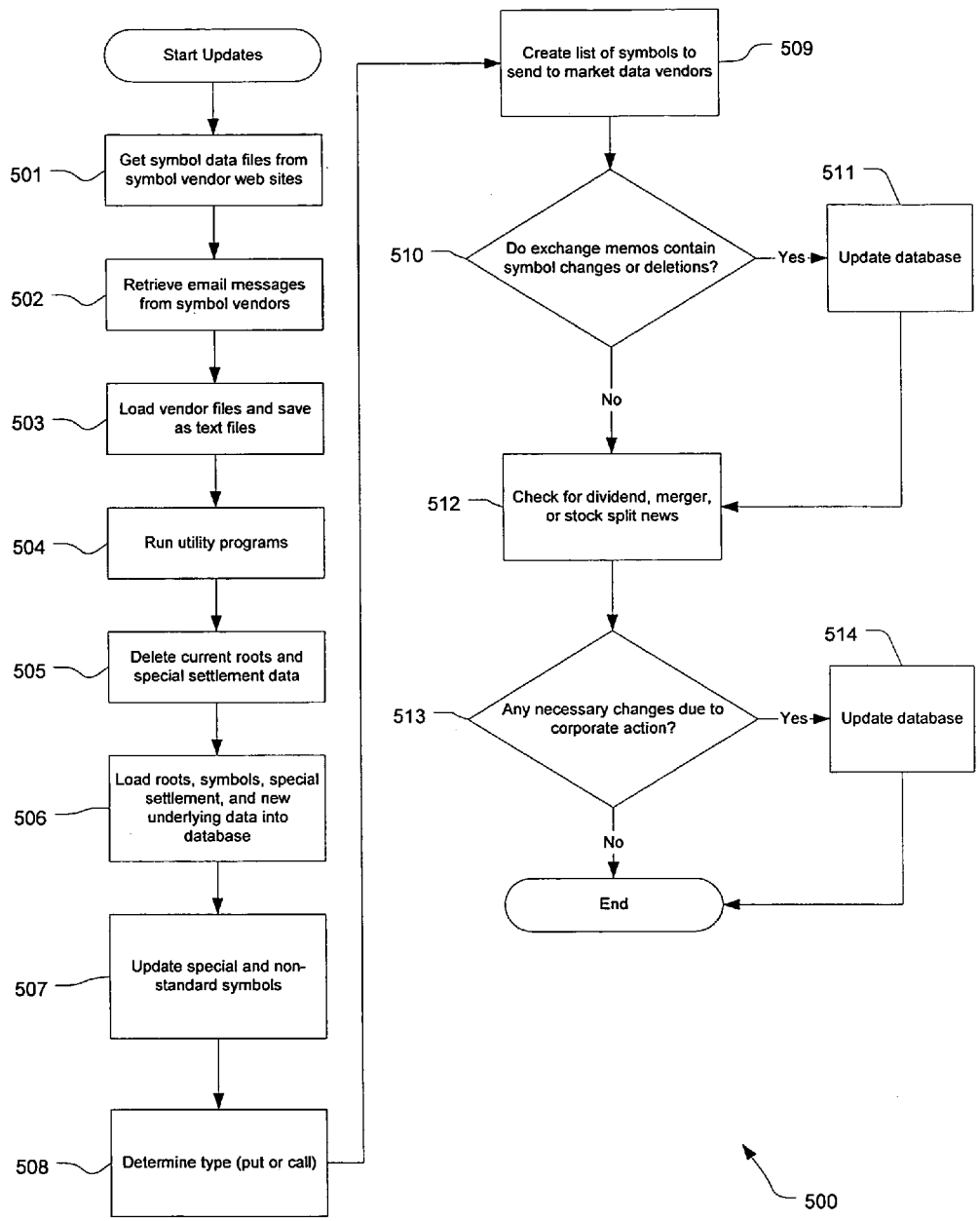
FIG. 5 is a flow diagram of an exemplary method for updating symbol data, according to an embodiment of the present invention.

Symbol Data Update Process Flow (FIG. 5)

FIG. 5 is a flow diagram of an exemplary method for updating symbol data, according to an embodiment of the present invention. In particular, FIG. 5 is a more detailed flowchart illustrating the process of updating symbol data 208 as performed by symbol data update component 211.

Method 500 begins at step 501 and 502, where symbol data update component 211 collects symbol data 208 from the symbol data providers. In one embodiment, symbol data provider interface 206 cooperates with symbol data receiving module 204 to collect symbol data from the OCC web site, exchange web sites, and exchange email communications. The OCC provides classified lists of current roots (e.g., all index LEAPS), special settlement information, and lists of underlying securities. Exchange web sites and emails provide updates to currently traded options. Vendor files in Microsoft Excel spreadsheet format are provided by the exchanges to be more easily read by software. Appendix E includes an exemplary spreadsheet from the Philadelphia Stock Exchange.

At step 503, symbol data receiving module 204 loads the vendor files and stores the files as text files. In one embodiment, this is accomplished with a spreadsheet program, which saves the retrieved vendor files as ASCII text files. At step 504, symbol data update component 211 runs utility programs, such as, for example, the SQLLDR utility for the Oracle 8i database, for loading a text file into database 202. Exemplary batch files, "daily.bat" and "grep.bat", for performing step 504 are provided in Appendix A.

At step 505, symbol data update component 211 deletes special settlement data from Roots table 404 and SpecialSettlement table 407 in database 202 to prepare for step 506. In step 506, symbol data receiving module 204 loads new roots into Roots table 404, new symbol data into Symbols table 402, and special settlement data into SpecialSettlement table 407.

Next, at step 507, Roots table 404 is updated using SpecialSettlement table 407 to reflect the SPC and NON-STD fields. At step 508, symbol data update component 211 uses the symbol code to determine the option type, call or put, and stores it in the TYPE field in Symbols table 402. At step 509, symbol data update component 211 may create a list of symbols to send to the market data vendors. In one embodiment, steps 505, 506, 507, 508, and 509 are performed using an "autoUp.bash" shell script provided in Appendix A.

At step 510, it is determined whether there are any exchange memoranda containing symbol changes or deletions. If so, symbol data update component 211 updates database 202 at step 511. Currently, these symbol changes or deletions are communicated by the symbol data providers using spreadsheet files. In one embodiment, database 202 may be manually updated by a human operator based on these symbol changes. Alternatively, this information may become available in electronic form, provided directly by the symbol data providers or converted to electronic form from the printed memoranda. In another embodiment of the present invention, symbol data update component 211 could incorporate scripts to handle the automatic updating of these symbol changes or deletions using this information in electronic form.

Corporate news may also impact the market information. Adjustments may be made to certain of the standardized terms of outstanding stock options when certain events occur, such as a cash dividend, stock distribution, stock split, reverse stock split, rights offering, distribution, reorganization, recapitalization, reclassification in respect of an underlying security, or a merger, consolidation, dissolution or liquidation of the issuer of the underlying security. Regulatory agencies typically provide rules for how the stock options are adjusted when one of the above-described events occurs. Some of these adjustments are described in "Characteristics and Risks of Standardized Options," published by The Options Clearing Corporation, February 1994, incorporated herein by reference in its entirety. Steps 512, 513, and 514 account for these types of adjustments.

In step 512, symbol data update component 211 monitors for corporate news such as dividend, merger, or stock split news. At step 513, symbol data update component 211 determines whether any changes are necessary due to the corporate action. If there are any changes that must be performed due to corporate action, database 202 is updated in step 514. In the event of a dividend change, the changes are updated or appended to DIVIDEND table 412. In the event of a stock split, split adjusted data and records are stored in SPLITS table 413, and the relevant split information is recorded to reconstruct the original data, if needed in the future. Split adjustment comprises multiplying existing strike prices and underlying prices by the split ratio, as described above. Appendix F contains a User's Guide describing the process for updating database 202 in response to various corporate events.

Afterwards, method 500 ends.

Figure 6:
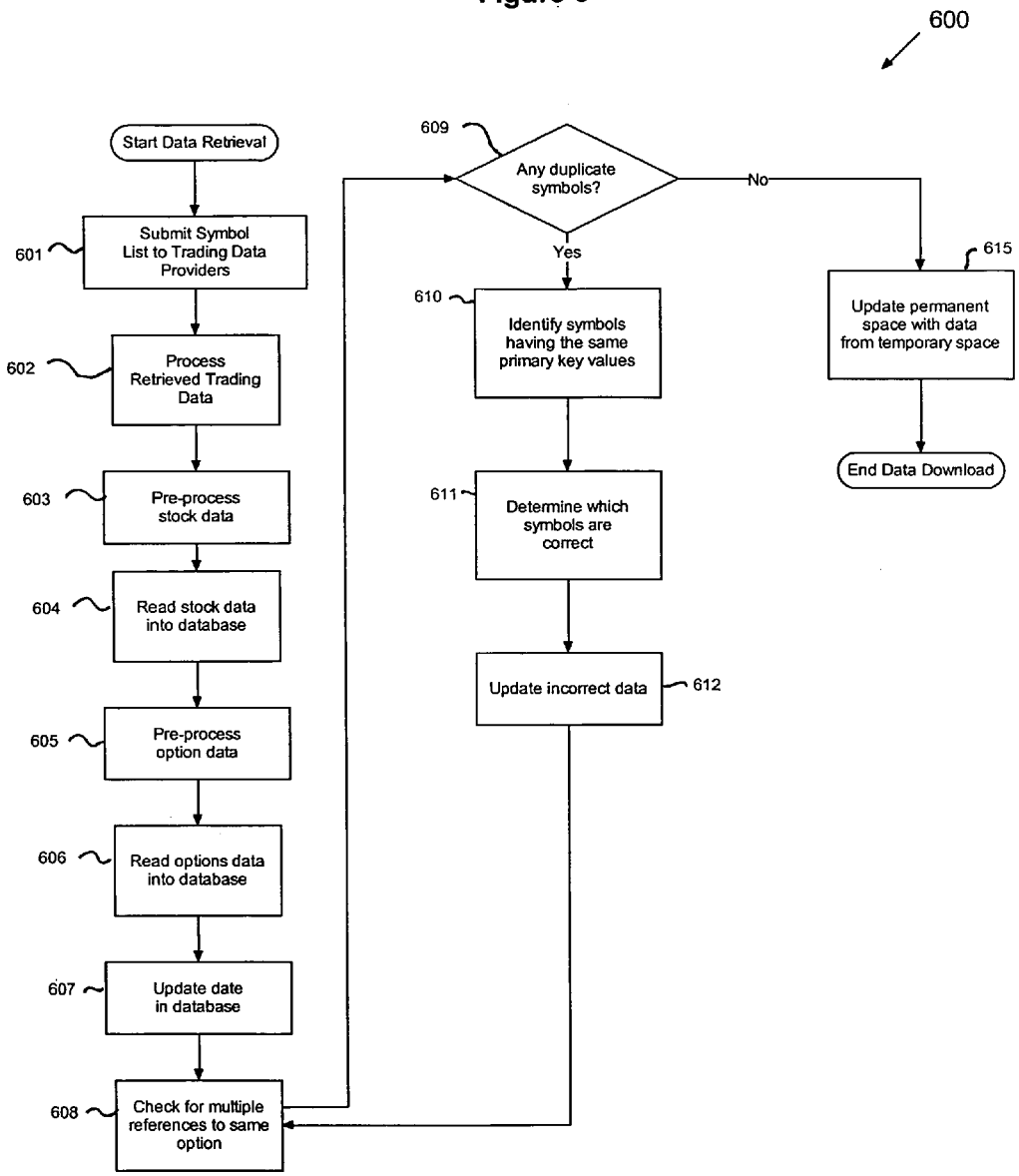
FIG. 6 is a flow diagram of an exemplary method for updating trading data, according to an embodiment of the present invention.

Market Data Update Process Flow (FIG. 6)

FIG. 6 is a flow diagram of an exemplary method for updating trading data, according to an embodiment of the present invention. In particular, FIG. 6 is a more detailed flowchart illustrating the process of receiving trading data as performed by trading data provider interface 214, trading data receiving module 212, and database scripts 210b.

Method 600 begins at step 601, where trading data receiving module 212 takes the symbol list prepared in step 509 (FIG. 5) and submits this list to a trading data provider (e.g., trading data providers 101–103). Each trading data provider will then provide trading data 216, often in a vendor-specific format. At step 602, trading data receiving module 212 processes this retrieved trading data 216 to convert it into a standard format, such as ASCII text.

At steps 603–606, trading data receiving module 212 pre-processes trading data 216 using, for example, the "after.bash" script, which, in turn, executes the "stock.bash" and "IQDataOptions.bash" scripts. At step 603, trading data receiving module 212 pre-processes database 202 by clearing the contents of IQDataOptions table 408 and ATMData table 401. In addition, the program "process.c" can be used to format the data into a more easily computer-readable form for uploading. At step 604, trading data receiving module 212 loads the stock data into database 202 using, for example, the SQLLDR utility. Next, at step 605, trading data receiving module 212 pre-processes the options data, which may include executing "addcomma.c" to format the data into a more easily computer-readable form. Finally, at step 605, trading data receiving module 212 loads the processed trading data into database 202.

At step 607, trading data receiving module 212 updates the trading data in IQDataOptions table 208 to set the correct date. The trading data received into the temporary storage table IQDataOptions table 408 is checked against symbol map 460 using, for example, script "dupeFinder.sql" at step 608. Temporary storage table IQDataOptions is used because of the possibility that duplicate references may exist. Duplicate references occur when multiple option symbols, as identified by their root and code, specify the same option, as defined by the primary keys (TRADEDATE, UNDERLYING, EXPDATE, STRIKE, TYPE, SPC, and NONSTD) of OptionsData table 205.

If any duplicate symbols are found at step 609, then further investigation at step 610 is performed using, for example, the "findDupes.sql" script to identify the symbols having the same primary key values. At step 611, an operator may manually determine which symbols are correct using information obtained electronically or via the telephone from the symbol data providers 121, 122 or trading data providers 101–103. Trading data receiving module 212 deletes the incorrect data or corrects the errors at step 612. The process returns to step 606, where database 202 is again checked for duplicate references.

When duplicate references are no longer found in database 202, the trading data is moved from temporary storage table IQDataOptions table 408 to OptionsData table 405 using, for example, the "IqtoData.sql" script. This completes method 600.

All of the above-mentioned scripts and programs are provided in Appendix A.

Market Data Processing

Figure 7:
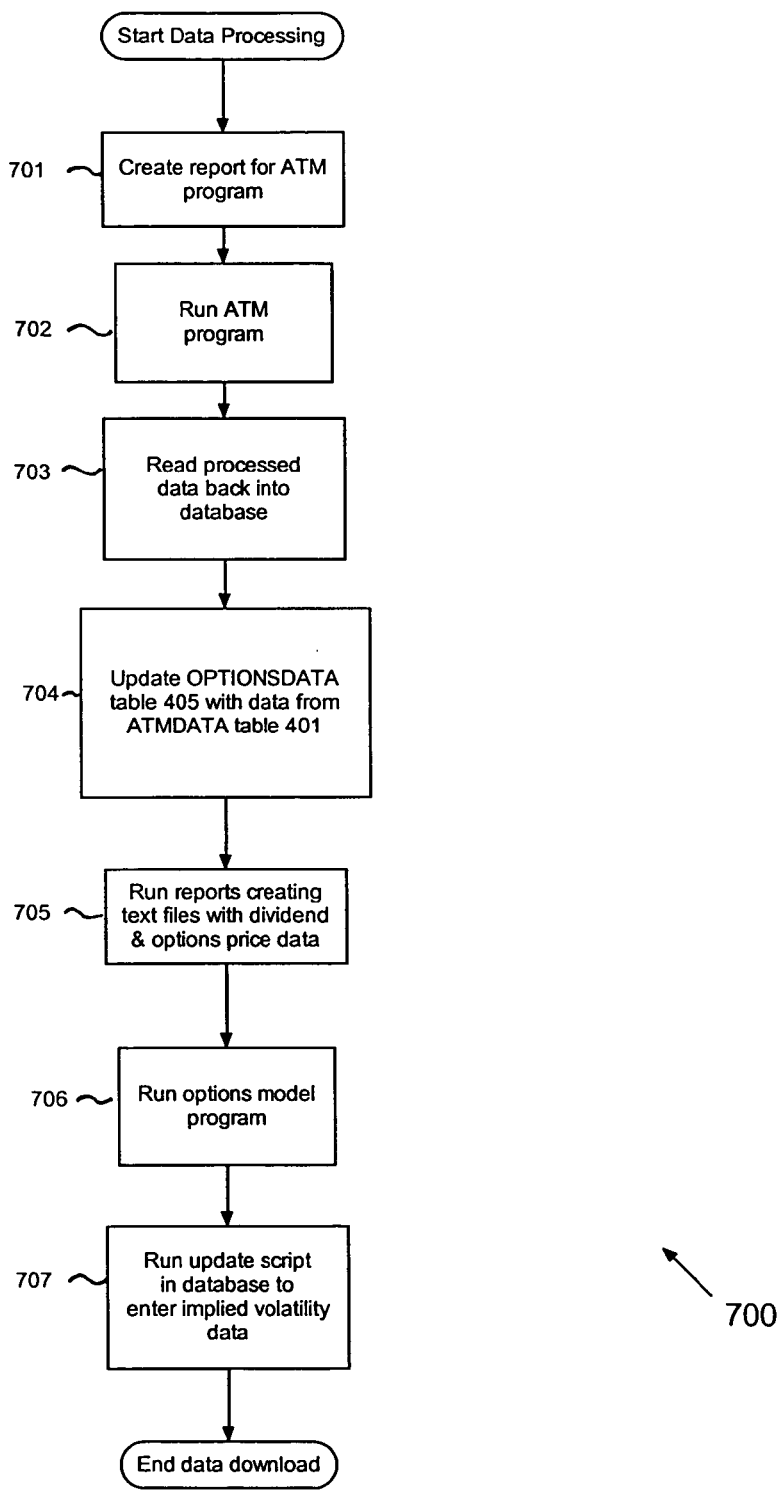
FIG. 7 is a flow diagram of an exemplary method for processing market data, according to an embodiment of the present invention.

FIG. 7 is a flow diagram of an exemplary method for processing market data, according to an embodiment of the present invention. FIG. 7 illustrates in greater detail the process of generating analysis information. At step 701, external programs module 222 executes, for example, the "atm.sql" script provided in Appendix A, to create a text file report for the ATM program.

The script produces a text file that contains information necessary to determine the floating frames of reference, which may, for example, be stored in the database 202 as ATM, RELATIVESTRIKE and MONTHNUM in OptionsData table 405. To determine values for these, the following information is written to a text file: underlying security, trade date, expiration information, type (put or call), shares per contract, standard/non-standard status, strike, distance of strike to the referenced underlying price and whether the option is a LEAP or not. For the purposes of the algorithm used by exemplary program "atm.c", provided in Appendix A, the data is sorted based on symbol, expiration date, difference of strike and underlying price, and by strike.

At step 702, external programs module 222 executes the ATM program on this text file to determine which options have strike prices which are at-the-money, what the RELATIVESTRIKE value should be, and what the MONTHNUM value should be. Appendix G shows the operation of the "atm.c" program. An algorithm may use the order of the information given by the "atm.sql" report to determine which are the strikes closest to the market price of the underlying (the at-the-money strike), the difference between the given strike and the ATM strike (RELATIVESTRIKE) and the relative ordering for sets of options with the same expiration dates (MONTHNUM).

At step 703, external programs module 222 loads the processed data back into temporary ATMData table 201 in database 202, and at step 704 uses this data to update the ATM, RELATIVESTRIKE and MONTHNUM fields in OptionsData table 405. An exemplary script for performing step 704 is the "atm2.sql" script provided in Appendix A. At step 705, external programs module 222 runs reports which create text files with dividend and options price data. These reports can be prepared using "toMod.sql" and "toDiv.sql" in Appendix A and are used as inputs to run an options model program, such as "calcVol.c", also in Appendix A. The script, "calcVol.c", outputs an SQL script, "implieds.sql". External programs module 222 uses this SQL script at step 707 to specify options to be updated with the appropriate implied volatilities.

Additional Database Maintenance

In addition to the daily routine described above for updating symbol map 460 and market data, additional regular and irregular maintenance is performed. As discussed previously, options expire every month and new expiration months are added. LEAPS become regular options. New symbols are added, including LEAPS and entirely new classes. Dividends must be updated and market data split adjusted. Maintenance includes handling all of the necessary changes that must be made, including those which are unanticipated.

The CBOE may issue a late memo describing new series that have been added or deleted but were not included in the original memo. Such series may be added using the addSymbol.sql script included in Appendix A.

To handle expirations, an exemplary embodiment may archive all expiring symbols before deletion from the operating database to improve performance. Which symbols are to be archived are determined by checking the expiration month and year as stored in SYMBOLS table 402. After the expiring symbols are archived, the new symbols are added. The exchanges (or the OCC) provide the list of symbols to be added for the Monday following expiration Friday. The process of gathering and loading the expiration symbols is much the same as the daily process of adding symbols.

LEAPS transition into regular options on a rolling basis. All standard options are on one of three cycles (January, February or March) and LEAPS roll according to cycle. The exchanges produce a list of old and new symbols for vendors. Like the expiration process, the relevant records in SYMBOLS table 402 are archived before being flushed from database 202. Then, using the files supplied by the exchanges, the new symbols are added in much the same way as before.

The exchanges notify vendors of upcoming corporate events that will impact option trading. This includes splits, tenders and merger/acquisition news. An exemplary embodiment adjusts for splits and provides a way to produce unadjusted data. First, the date and split ratio are stored in Splits table 413. A script then adjusts underlying data (both price and volume), dividend data and the options data (including pricing data, strike, open interest and volume). Next, the adjusted strikes are rounded to the nearest ⅛ of a point. The OCC changes the symbols for the post-split options. The pre-split symbols are archived and deleted. The pre-split symbols are archived to a text file and deleted from the operating SYMBOLS table. The post-split symbols are downloaded from the OCC's web site and added to database 202 in a similar fashion as described above. Generally speaking, mergers and acquisitions are handled as updates to ROOTS table 404.

Dividends are an important parameter to compute implied volatilities or theoretical option prices. The exchanges do not provide any information on current or expected dividend amounts or dates. Although the data is available on corporate web sites and some data services, it is either expensive or not easily accessible. Dividend streams must also be projected into the future. DIVIDENDS table 412 stores this information.

Queries and Reports

Conventional market data systems may provide a user with a measure of volatility for a single stock over a period of time or may report the change in premium of a single derivative over that period of time. In contrast, the above-described embodiments of the present invention store extensive amounts of market data in order to provide to users more useful analysis information.

These embodiments provide users the ability to request reports based on the relation to underlying price and on the time until expiration without the requirement of extensive programming. The present invention integrates a knowledge base from derivatives trading with understanding of computer technology, thus allowing the creation of sophisticated queries on the extensive derivatives database 202, and in response, receive useful analysis information that can be easily applied for the purpose of increasing trading profits.

Database 202 can include data on all relevant derivatives (e.g., all options in a given class), and provide market context and original pricing data. Some trading data providers may provide original pricing data, but do not provide the context for that data. Instead, those vendors provide pricing data that is accessible only by specification to a given instrument. For example, a vendor may provide pricing data on only the Microsoft Corp. (MSFT) January 2000 100 call. Some vendors may provide a single numerical summary of all options in a given class (e.g., all MSFT options), and others may provide a summary for each expiration month when specified (e.g., all MSFT January 2000 options).

In accordance with an embodiment of the present invention, market data analysis system 100 provides the functionality to enable users to make queries based on a floating frame of reference. In one embodiment, this floating frame of reference is defined by the proximity of an option's strike price to the market price of the underlying instrument. Queries can therefore be structured to use proximity to ATM strikes as search criteria. In the above-described embodiment, when the trading data is entered into database 202, information regarding the strikes which are ATM and the proximity to ATM are stored in the ATM and RELATIVESTRIKE fields for each option. Alternatively, the ATM information may be calculated as requested by the user, or "on-the-fly".

The definition of what constitutes ATM can be modified in various embodiments. For example, the ATM strike may be defined as the option whose strike price is closest to the underlying security's market value. Alternatively, ATM could be defined as the option having a strike price within a specified range of the price of the underlying security. In yet another embodiment, a "synthetic" ATM strike can be calculated as being a theoretical strike which does not exist but is theoretically struck at the exact underlying price and is a weighted average of multiple derivatives having strike prices surrounding the market price of the underlying instrument. For example, if ABC stock has a market value of 22½, Option X has a strike price of 20 and a premium of 5, and Option Y has a strike price of 25 and a premium of 10, then a synthetic ATM option can be calculated as the average of Options X and Y. Thus, synthetic Option Z has a strike price of (20+25)/2=22½, and a premium of (5+10)/2=7½.

Market data analysis system 100 can also establish a floating frame of reference based on time. In one example, system 100 transforms absolute expiration months from month names to relative month locations. This is of particular applicability to exchange traded options which have regulated expiration dates mandating that they expire on the Saturday following the third Friday of the expiration month. Another floating frame of reference based on time is "days until expiration." An exemplary embodiment may calculate the difference between TRADEDATE (date of the market data sample) and EXPDATE (the expiration date) as needed for reporting.

Figure 10:
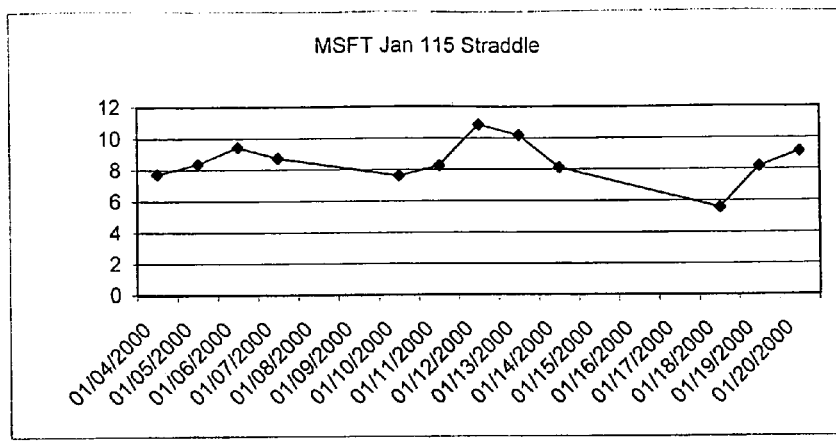
FIG. 10 is a chart illustrating prior art straddle price data.
Figure 9:
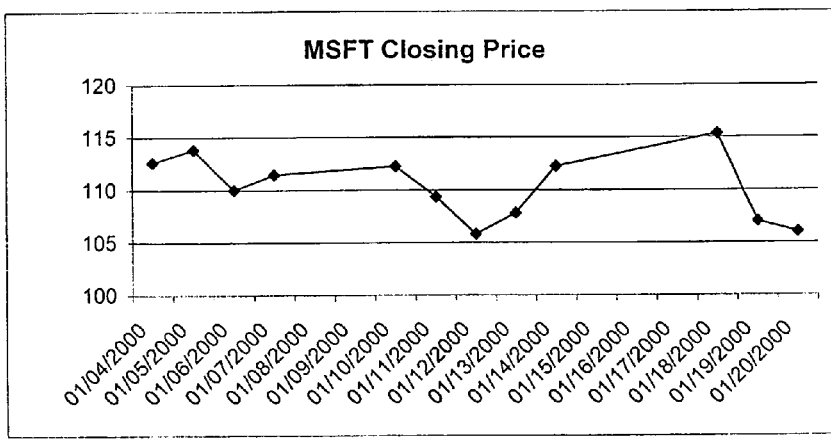
FIG. 9 is a chart illustrating prior art stock price data.

FIGS. 9 and 10 illustrate the types of trading data normally retrieved by traders. FIG. 9 shows a report 900 of the Microsoft Corp. (MSFT) closing market prices for 4 Jan. 2000 to 20 Jan. 2000. On 4 January, MSFT closed at 112 ⅝, and the TM straddle is defined as the 115 straddle. Because 4 January is prior to the third Friday of January, options having a January 2000 expiration date are front month options.

For 4 Jan. 2000, the value of the January 2000 115 straddle is the same as that for the front month ATM straddle, i.e., they refer to the same options. However, as time progresses in FIG. 9, the market value of the underlying instrument (MSFT) changes. Accordingly, the ATM straddle for MSFT changes. Thus, on 6 January, the ATM straddle is no longer the January 2000 115 straddle, but instead has become the January 2000 110 straddle. On 12 January, the ATM straddle becomes the January 2000 105 straddle, and on 18 January, the ATM straddle once again becomes the January 2000 115 straddle.

FIG. 10 shows a report 1000 of the change in premium of the January 2000 115 straddle over the same period of time. As can be seen, the value of the January 2000 115 straddle changes significantly over time, and this change in value can correspond to the days on which the January 2000 115 straddle is ATM and those it is not. However, the amount of useful information which a trader can derive from FIG. 10 is limited because the chart tracks only the series referred to by a single strike (the January 2000 115 straddle). Although the January 2000 115 straddle is particularly relevant on 4 Jan. 2000 because it is the ATM straddle on that day, as the market value of MSFT changes with time, the relevance of the January 2000 115 straddle may decrease. The ability to view the ATM straddle over time can provide an options trader with valuable information regarding how to price options.

In accordance with an embodiment of the present invention, trader 111 can utilize user interface 230 to access database 202 by generating queries to database 202 with query module 232. An exemplary query to request an ATM straddle report is as follows:

---
Sample Query 1 for ATM Straddle Report
---
select tradedate, sum ((bid+ask) /2) from optionsdata
where    underlying='MSFT' and
         relativestrike='0' and
         tradedate>='01/01/2000' and
         tradedate<='03/09/2000' and
         monthnum=1
group by tradedate;

---

Figure 11:
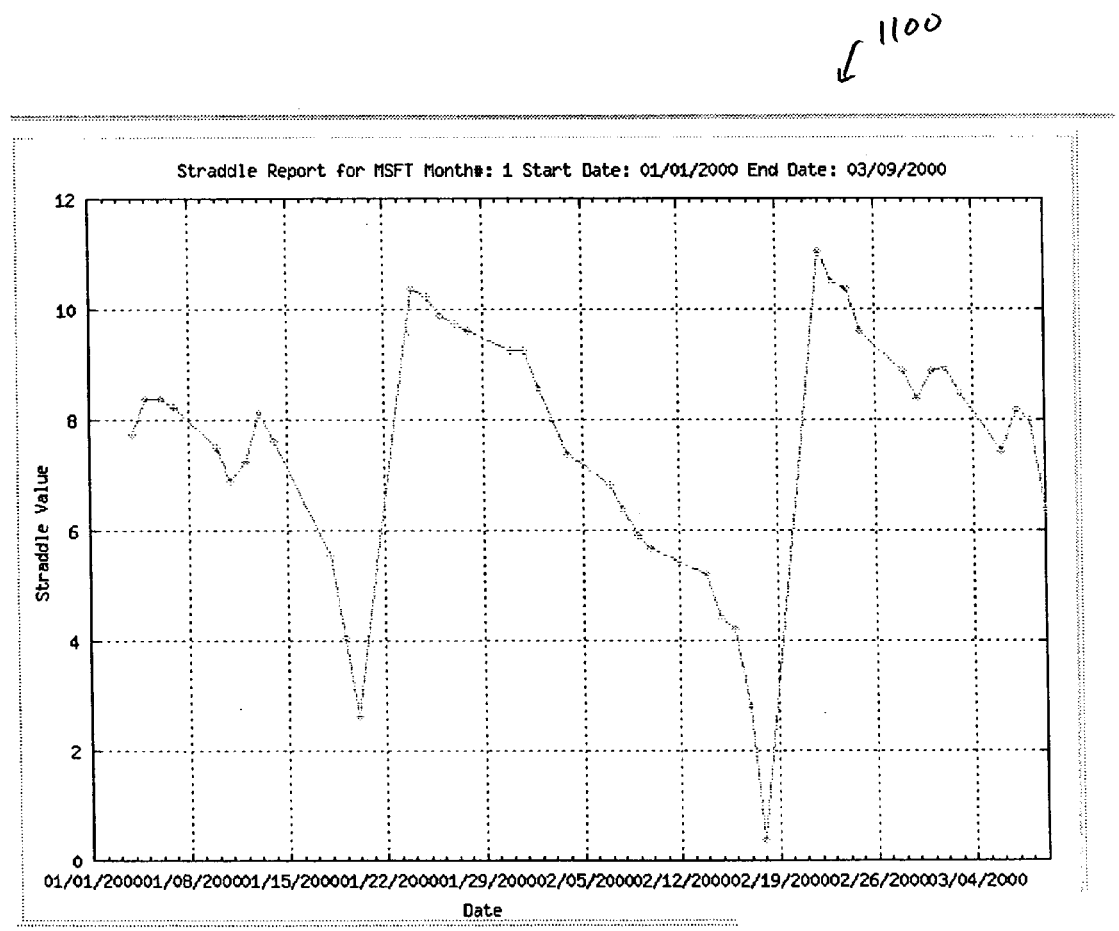
FIG. 11 is a chart illustrating an exemplary straddle report, according to an embodiment of the present invention.

FIG. 11 shows an exemplary ATM straddle report 1100 which may be produced by market data analysis system 100 in response to sample query 1 above. The x-axis corresponds to the time period of 1 Jan. 2000 to 9 Mar. 2000. The y-axis corresponds to the premium for the front month ATM straddle on the day indicated by the x-axis. Each day, as the value of the underlying security (MSFT) changes, the derivative having the strike price which is the ATM straddle strike changes accordingly. In contrast with prior art systems which produce reports such as report 1000 shown in FIG. 10, ATM straddle report 1100 is not restricted to a single derivative, but instead selects from the entire class of MSFT derivatives to present only the derivative which is currently at-the-money. As can be seen, the premium for the front month ATM derivative changes dramatically over time, particularly on the days immediately preceding the expiration of the option.

Thus, in response to sample query 1, market data analysis system 100 produces a report 1100 having a floating frame of reference which is dependent on the market price of the underlying instrument. System 100 uses a relative reference value that is a function of one characteristic of each derivative in the class (strike price) and one characteristic of the underlying instrument (market price). The relative reference value can be stored in the RELATIVESTRIKE field in OptionsData table 405. The RELATIVESTRIKE field is calculated as the difference between the strike price of the derivative and the determined ATM strike. The ATM strike may be defined as that strike, for a given expiration date, that is closest to the current market price of the underlying. For sample query 1, the reference criteria used for evaluation are derivatives having a RELATIVESTRIKE value equal to zero, which corresponds to derivatives which are at-the-money. Thus, for each time increment on the x-axis, the reference criteria is used to select the ATM derivative, and another characteristic of that ATM derivative (the premium) is plotted on the y-axis.

While sample query 1 produces a chart 1100 displaying the premium of the ATM straddle, it is possible to produce queries which search for options that are not exactly ATM, i.e., the reference criteria need not be RELATIVESTRIKE='0'. Alternative queries can be performed to search for options having strike prices within a certain dollar amount or percentage of the underlying market price. Numerous variations are possible, as would be understood by one of ordinary skill in the art.

Figure 12:
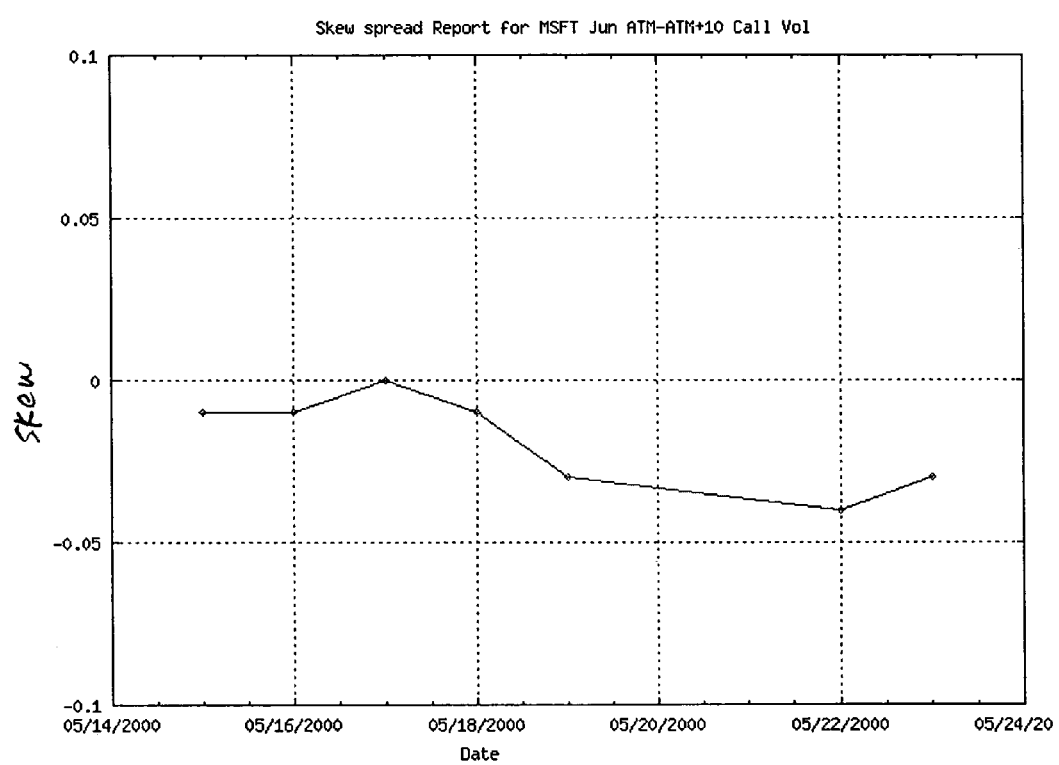
FIG. 12 is a chart illustrating an exemplary historical skew spread report, according to an embodiment of the present invention.

In accordance with another embodiment of the present invention, a user can generate the following query to produce a report 1200 shown in FIG. 12.

| Sample Query 2 for Skew Report |
|---|
| select o.tradedate, (o.impliedvol-p.impliedvol)<br>from optionsdata o, optionsdata p<br>where   o.tradedate>='5/15/2000' and<br>         o.tradedate<='5/23/2000' and<br>         o.tradedate=p.tradedate and<br>         o.underlying='MSFT' and<br>         o.underlying=p.underlying and<br>         o.relativeStrike=0 and p.relativeStrike=10 and<br>         o.type='C' AND p.type='C' and<br>         o.expdate='6/16/2000' and<br>         p.expdate='6/16/2000'; |

Sample query 2 provides analysis information to traders which illustrates skew values (differences in implied volatilities between strikes) having a floating frame of reference based on the ATM strike. For example, report 1200 provides the skew, i.e., difference in implied volatilities, for the ATM and ATM+10 calls in MSFT for the period 1 May 2000 to 20 May 2000 for June options. As with sample query 1 and report 1100, the RELATIVESTRIKE field provides a relative reference value based on the strike price and the market price of the underlying instrument. System 100 then identifies the derivatives that have a relative reference value (RELATIVESTRIKE value) which satisfies the selected reference criteria (ATM and ATM+10). The skew between the ATM and ATM+10 derivatives is then plotted on the resulting chart 1200, shown in FIG. 12.

Figure 13:
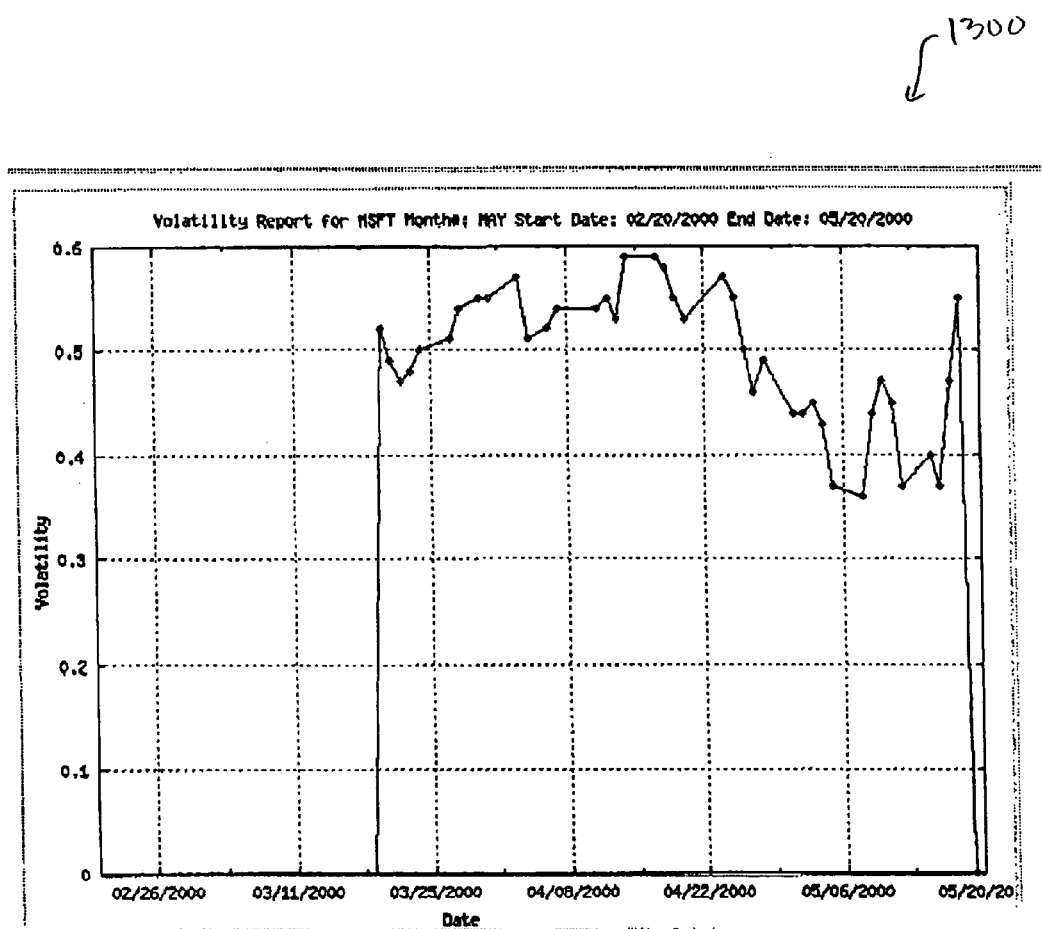
FIG. 13 is a chart illustrating an exemplary volatility report, according to an embodiment of the present invention.

Another example of how system 100 incorporates a floating frame of reference based on the market price of the underlying instrument is provided by the implied volatility report 1300 in FIG. 13. FIG. 13 shows an exemplary implied volatility report 1300 which may be produced by market data analysis system 100 in response to sample query 3 listed below. The x-axis corresponds to the time period of 20 Feb. 2000 to 20 May 2000. The y-axis corresponds to the implied volatility for the May 2000 ATM call option.

| Sample Query 3 for Implied Volatility Report |
|---|
| Select tradedate, impliedvol<br>From optionsdata o, expirations e<br>        where underlying='MSFT' and relativestrike='0'<br>and<br>        tradedate>='02/20/2000' and<br>        tradedate<='05/20/2000' and e.month='MAY' and<br>        type='C' and e.year=2000 and e.expdate=o.expdate<br>order by tradedate; |

As can be seen in report 1300, there is no data prior to 20 Mar. 2000 because the options for the May 2000 strike do not begin trading until after the expiration of the March 2000 options. Similarly, there is no data after 20 May 2000 because the May 2000 expiration date has passed.

In report 1300, the relative reference value is the difference between the strike price of the option and the ATM strike of the underlying instrument, i.e., the RELATIVESTRIKE field. Again, the reference criteria for evaluating the derivatives is ATM. In other words, the user wishes to identify those derivatives whose strike prices are at-the-money for each day in the requested time frame. As described above, the ATM derivative will change as the market price of the underlying instrument fluctuates over time. Unlike sample queries 1 and 2, sample query 3 requests that the y-axis for the chart indicate the implied volatility of the ATM derivative, instead of the premium price. This implied volatility can be taken from the IMPLIEDVOL field in OptionsData table 405. As described above, the calculation of IMPLIEDVOL can utilize any of a number of well-known implied volatility models. In alternative embodiments, the implied volatility can be calculated based on a user's preference or using a user's model. Advantageously, database 202 contains all of the necessary market data to re-calculate implied volatility based on a multitude of different models.

Figure 14:
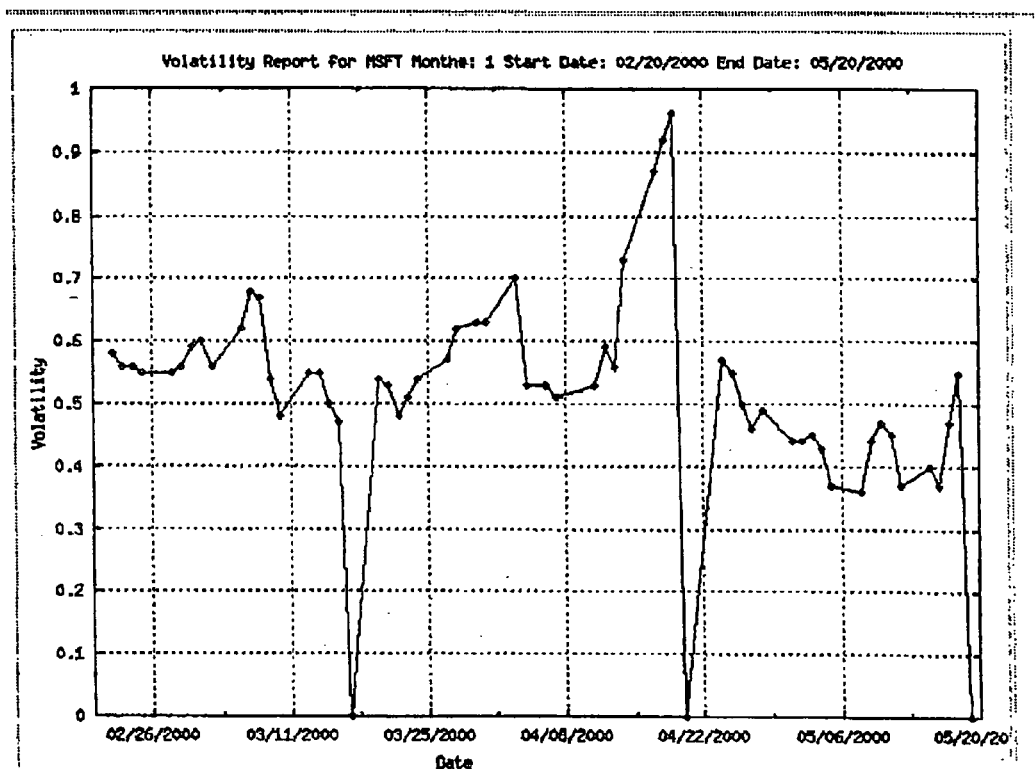
FIG. 14 is a chart illustrating an exemplary volatility report, according to an embodiment of the present invention.

Another example of an additional floating frame of reference used by embodiments of the present invention is illustrated in FIG. 14. Market data analysis system 100 provides an automatic system for organizing derivatives market data based on relative months. Queries can then be entered based on front month, second month, and so on. Queries can also be entered based on front LEAP, second LEAP, and so on. Thus, a single report may return information on any number of expirations given particular reporting dates.

| Sample Query 4 for Implied Volatility Report |
|---|
| select tradedate, impliedvol<br>from optionsdata<br>where underlying='GE' and relativestrike='0' and<br>        tradedate>='02/20/2000' and<br>tradedate<='05/20/2000'<br>        and monthnum=1 and type='C' |

Sample query 4 can be used to produce a report 1400 shown in FIG. 14, in which system 100 is again identifying those derivatives which are ATM for each date in the time frame of 20 Feb. 2000 to 20 May 2000. However, an additional relative reference value is used, that relative reference value being a function of the expiration date for each derivative in the plurality of General Electric (GE) derivatives and a time variable corresponding to the time indicated by the x-axis. The reference criteria for this relative reference value is "front month". Thus, for each date between 20 Feb. 2000 and 20 May 2000, system 100 identifies those derivatives which are both front month derivatives and ATM.

Like report 1300, report 1400 plots the implied volatility of the ATM derivatives for each day in the time frame of 20 Feb. 2000 to 20 May 2000. Report 1300, however, tracks only those derivatives having a May 2000 expiration date. Thus, no information is provided prior to 20 Mar. 2000, because no May 2000 expiry derivatives exist at that point. Between 21 Mar. 2000 to 20 Apr. 2000, the implied volatility provided in report 1300 corresponds to second month ATM derivatives (i.e., derivatives which will not expire until May 2000). Then, between 24 Apr. 2000 to 19 May 2000, the ATM derivatives which are plotted in report 1300 correspond to the front month derivatives.

In contrast, report 1400 provides analysis information for only the front month derivatives over the same time span. Thus, from 20 Feb. 2000 to 18 Mar. 2000, the implied volatility of the front month ATM derivatives (i.e., those expiring on 18 Mar. 2000) are plotted. Starting 20 Mar. 2000, the implied volatility of ATM derivatives having expiration dates of 22 Apr. 2000 are plotted. Then, from 24 Apr. 2000 to 20 May 2000, the implied volatility of ATM derivatives having expiration dates of 20 May 2000 are plotted. Note that the portion of report 1400 which corresponds to the time period of 24 Apr. 2000 to 20 May 2000 is identical to the portion of FIG. 13 which corresponds to the same time period. This is because during this time period both figures are plotting the front month ATM derivatives.

Figure 15:
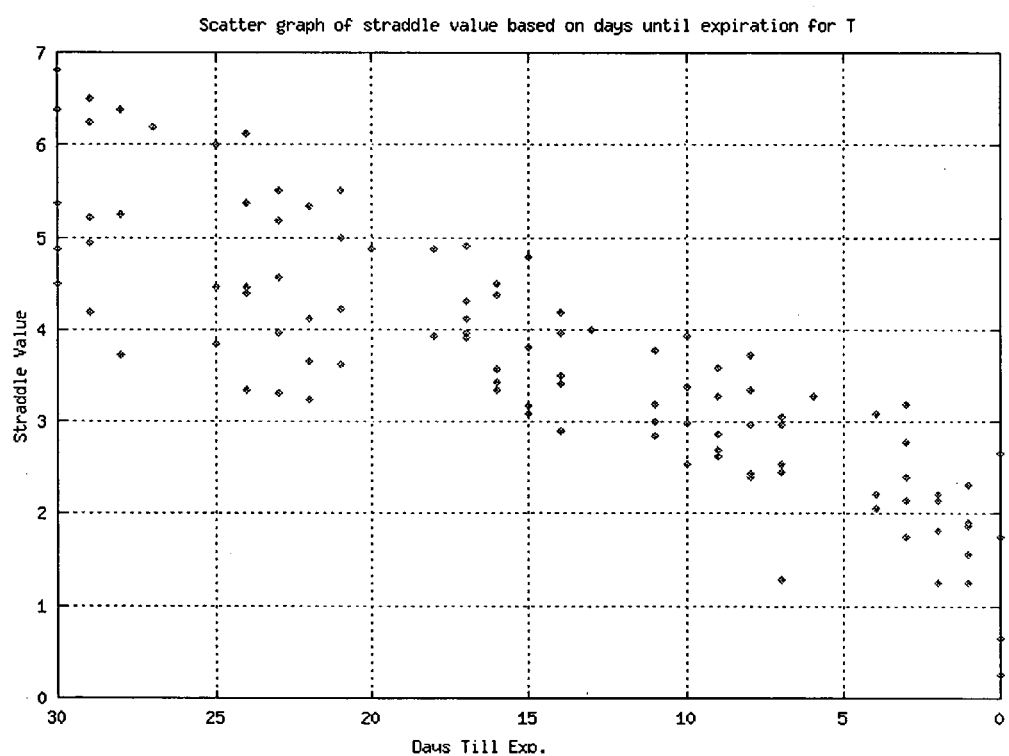
FIG. 15 is a chart illustrating an exemplary report using days until expiration as a relative time reference, according to an embodiment of the present invention.

In addition to a relative reference based on expiration month, another relative time reference may be days until expiration. An example of using this additional floating frame of reference is illustrated in FIG. 15. Sample Query 5 can be used to produce a report 1500 shown in FIG. 15. The calculation of days until expiration may be calculated as needed ("on the fly"). This report provides straddle data for multiple expirations having the number of days until expiration indicated by the x-axis point. For instance, when days until expiration is 30, Query 5 provides data for all options having a TRADEDATE field indicating 30 days until expiration. Advantageously, this provides the user with a visual overview of the distribution of values that straddles of a specific term have had in the past.

---

Sample Query 5 for Scatter Plot of ATM Straddle vs. Days Until Expiration

---

Select (expdate-tradedate) , sum((bid+ask) /2)
From optionsdata
Where (expdate-tradedate) <=30 and underlying='T' and
    atm=0
group by expdate,tradedate;

---

While the floating frame of reference examples described above relate to exchange-traded options having standard expiration dates, embodiments of the present invention may be used with other types of derivatives as well. The relative month transformation can be applied to OTC options having non-standard expiration dates by organizing options having close expiration dates into fixed term "bins." Bins could be defined to "hold" a group of options that have specified maturity ranges, e.g., 15–25 days or 180–230 days. This would serve to provide the same sort of relative time reference that relative month provides. Traders are often more interested in the approximate tenor rather than the exact term of the option, so this approximate grouping of expiration dates can provide useful information for traders. Bins could also be used for exchange traded options.

By incorporating an understanding and knowledge of ATM strikes and relative months, market data analysis system 100 can provide easier and more useful querying. Reports based on relationships to the underlying instrument and relative months provides useful market information to traders, which the traders can then use as reference points for derivative pricing. In addition to providing the ability to query database 202, market data analysis system 100 could provide standard reports based on ATM strikes and relative months using a graphical user interface accessible over the Internet.

Figure 16:
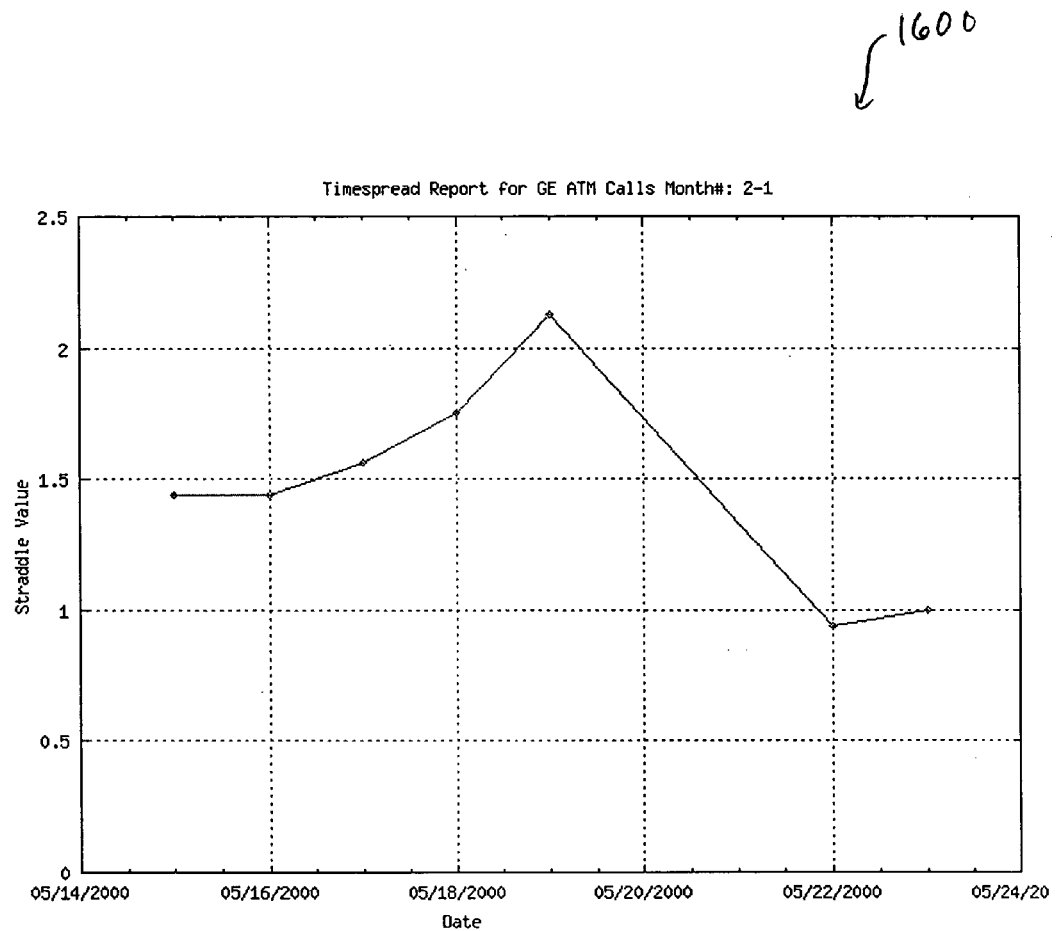
FIG. 16 is a chart illustrating an exemplary front to second month spread report, according to an embodiment of the present invention.

FIG. 16 illustrates an example of the use of a floating frame of reference based on time, in accordance with another embodiment of the present invention. Sample query 6 below can be used to produce a report 1600 shown in FIG. 16.

---

Sample Query 6 for Implied Volatility Report

--- select o.tradedate, (o.ask-p.ask)
from optionsdata o, optionsdata p
where    o.tradedate>='5/15/2000' and
           o.tradedate<='5/23/2000' and
           o.tradedate=p.tradedate and
           o.underlying='GE' and
           o.underlying=p.underlying and
           o.relativeStrike=0 and p.relativeStrike=0 and
           o.type='P' AND p.type='P' and
           o.monthnum=2 and
           p.monthnum=1;

---

In report 1600, there is a first floating frame of reference based on ATM, such that system 100 identifies those derivatives which are ATM for the relevant dates. In addition, there is a second floating frame of reference based on the expiration date. Thus, system 100 converts the absolute expiration date into a relative expiry (e.g., front month, second month, etc.), and sorts the derivatives based on that frame of reference as well. In response to sample query 5, system 100 identifies the front month and second month ATM derivatives for each date on the x-axis, and plots the difference between the premium values. This process provides relative pricing measures using the floating frame of reference.

Although the invention has been described with reference to particular embodiments, the description is only an example of the invention's application and should not be taken as a limitation. In much of the discussion above, the derivative type analyzed by market data analysis system 100 is a straddle option, which is the purchase of a call and a put at the same strike price, the same expiry, and same underlying instrument. It will be understood that in alternative embodiments, the derivative type may be a call option alone, a put option alone, or any of the above-described spreads and combinations of derivatives. In addition, the reports identified in FIGS. 9–15 were in response to various queries submitted by the user. In other embodiments, standard, preset queries can be provided by system 100. In addition, although FIGS. 11–15 illustrate reports present in chart format, numerous variations on the presentation of the market information provided by system 100 are possible, as would be understood by one of ordinary skill in the art.

Even though much of preceding discussion was aimed at exchange traded stock options, alternative embodiments of this invention can incorporate data from OTC derivatives, such as OTC options or swaps, international securities, futures, and embedded derivatives such as warrants, convertible bonds, and convertible preferred stock. In addition, market data analysis system 100 and method of operation can handle multiple models and store multiple implied volatility values. The system and method may also store both dividend history and dividend projections. Also, although the Appendices and corresponding discussion above relate to the use of scripts and external programs, other embodiments include the use of Java, C++, or other procedural or object-oriented programming language or technology to handle data processing.

Various other adaptations and combinations of features of the embodiments disclosed are within the scope of the invention as defined by the following claims.

What is claimed is:

1. A method performed on a computer for analyzing historical option market data, the method comprising:
    storing a plurality of characteristics that define an option and market data for each option in a plurality of options;
    determining one or more relative reference value(s) for each option in the plurality of options, said relative reference value(s) calculated using one or more defining characteristic(s) of the option and one or more other datum(a);
    selecting criteria including said relative reference value(s); and
    identifying option data in said plurality of options satisfying said criteria.

2. The method of claim 1, wherein the options in said plurality of options are contracts based on a comprehensive set of underlying instruments.

3. The method of claim 2, wherein the options in said plurality of options are equity options or equity linked securities having embedded options.

4. The method of claim 3, further includes the step of determining an implied volatility for each option in said plurality of options.

5. The method of claim 4, wherein the step of identifying said option data in said plurality of options satisfying said criteria:
    identifies option data satisfying said criteria or
    identifies option data in a range around said criteria or
    calculates an interpolated or extrapolated value satisfying said criteria.

6. The method of claim 5, further includes the step of calculating mathematical functions of the characteristics of said identified options.

7. A method performed on a computer for analyzing historical option market data, the method comprising:
    storing a plurality of option characteristics that define an option and market data for each option in a plurality of options;
    determining one or more relative reference value(s) for each option based on a formulation of the relationship of an option strike price and a market price of an underlying instrument using a subset of the following: option strike price, option type, exercise style, underlying instrument market price, appropriate interest rate, trade date, option expiration date, underlying instrument cash flow projections, volatility, option delta;
    selecting criteria including said relative reference value(s); and
    identifying option data in the plurality of options satisfying said criteria.

8. The method of claim 7, wherein the options in said plurality of options are contracts based on a comprehensive set of underlying instruments.

9. The method of claim 8, wherein the options in said plurality of options are equity options or equity linked securities having embedded options.

10. The method of claim 9, further includes the step of determining an implied volatility for each option in said plurality of options.

11. The method of claim 10, wherein the step of identifying said option data in said plurality of options satisfying said criteria:
    identifies option data satisfying said criteria or
    identifies option data in a range around said criteria or
    calculates an interpolated or extrapolated value satisfying said criteria.

12. The method of claim 11, further includes the step of calculating mathematical functions of the characteristics of said identified options.

13. A method performed on a computer for analyzing historical option market data, the method comprising:
    storing a plurality of option characteristics that define an option and market data for each option in a plurality of options where the characteristics includes a trade date and an absolute expiration date;
    determining one or more relative reference value(s) for each option corresponding to a relative expiration date based on the trade date and the option expiration date;
    selecting criteria including said relative reference value(s); and
    identifying option data in the plurality of options satisfying said criteria.

14. The method of claim 13, wherein the options in said plurality of options are contracts based on a comprehensive set of underlying instruments.

15. The method of claim 14, wherein the options in said plurality of options are equity options or equity linked securities having embedded options.

16. The method of claim 15, further includes the step of determining an implied volatility for each option in said plurality of options.

17. The method of claim 16, wherein the step of identifying said option data in said plurality of options satisfying said criteria:
    identifies option data satisfying said criteria or
    identifies option data in a range around said criteria or
    calculates an interpolated or extrapolated value satisfying said criteria.

18. The method of claim 17, further includes the step of calculating mathematical functions of the characteristics of said identified options.

19. A computer system for historical options market analysis, comprising:
    a database for maintaining a plurality of option characteristics that define an option and market data for each option in a plurality of options; and
    processing software coupled to the database, the processing software:
        determines one or more relative reference value(s) for each option in the plurality of options, said relative reference value(s) calculated using one or more defining characteristic(s) of the option and one or more other datum(a);
        selects criteria including said relative reference value(s); and
        identifies option data in the plurality of options satisfying said criteria.

20. The computer system of claim 19, wherein the options in said plurality of options are contracts based on a comprehensive set of underlying instruments.

21. The computer system of claim 20, wherein the options in said plurality of options are equity options or equity linked securities having embedded options.

22. The computer system of claim 21, wherein the processing software includes means for determining an implied volatility for each option in said plurality of options.

23. The computer system of claim 22, includes means of identifying said option data in said plurality of options satisfying said criteria:
- by identifying option data satisfying said criteria or
- by identifying option data in a range around said criteria or
- by calculating an interpolated or extrapolated value satisfying said criteria.

24. The computer system of claim 23, includes means for creating reports that have mathematical functions of the characteristics of said identified options.

25. A computer system for historical options market analysis, comprising:
- a database maintaining a plurality of characteristics that define an option and market data for each option in a plurality of options; and
- processing software coupled to the database, the processing software:
  - determines one or more relative reference value(s) for each option based on a formulation of the relationship of an option strike price and a market price of an underlying instrument using a subset of the following: option strike price, option type, exercise style, underlying instrument market price, appropriate interest rate, trade date, option expiration date, underlying instrument cash flow projections, volatility, option delta;
  - selects criteria including said relative reference value(s); and
  - identifies option data in the plurality of options satisfying said criteria.

26. The computer system of claim 25, wherein the options in said plurality of options are contracts based on a comprehensive set of underlying instruments.

27. The computer system of claim 26, wherein the options in said plurality of options are equity options or equity linked securities having embedded options.

28. The computer system of claim 27, wherein the processing software includes means for determining an implied volatility for each option in said plurality of options.

29. The computer system of claim 28, includes means of identifying said option data in said plurality of options satisfying said criteria:
- by identifying option data satisfying said criteria or
- by identifying option data in a range around said criteria or
- by calculating an interpolated or extrapolated value satisfying said criteria.

30. The computer system of claim 29, includes means for creating reports that have mathematical functions of the characteristics of the identified options.

31. A computer system for historical options market analysis, comprising:
- a database maintaining a plurality of option characteristics that define an option and market data for each option in a plurality of options; and
- processing software coupled to the database, the processing software:
  - determines one or more relative reference value(s) for each option corresponding to a relative expiration date based on the trade date and the option expiration date;
  - selects criteria including said relative reference value(s); and
  - identifies option data in the plurality of options satisfying said criteria.

32. The computer system of claim 31, wherein the options in said plurality of options are contracts based on a comprehensive set of underlying instruments.

33. The computer system of claim 32, wherein the options in said plurality of options are equity options or equity linked securities having embedded options.

34. The computer system of claim 33, wherein the processing software includes means for determining an implied volatility for each option in said plurality of options.

35. The computer system of claim 34, includes means of identifying said option data in said plurality of options satisfying said criteria:
- by identifying option data satisfying said criteria or
- by identifying option data in a range around said criteria or
- by calculating an interpolated or extrapolated value satisfying said criteria.

36. The computer system of claim 35, includes means for creating reports that have mathematical functions of the characteristics of the identified options.

* * * * *